(12) United States Patent
Frederick et al.

(10) Patent No.: US 10,374,808 B2
(45) Date of Patent: *Aug. 6, 2019

(54) VERIFICATION SYSTEM FOR CREATING A SECURE LINK

(71) Applicant: BANK OF AMERICA CORPORATION, Charlotte, NC (US)

(72) Inventors: Carl R. Frederick, Lexington, OH (US); Joel S. Kazin, Pleasantville, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/453,642

(22) Filed: Mar. 8, 2017

(65) Prior Publication Data

US 2018/0262345 A1    Sep. 13, 2018

(51) Int. Cl.
| | |
|---|---|
| *H04L 9/32* | (2006.01) |
| *H04L 9/14* | (2006.01) |
| *H04L 29/06* | (2006.01) |
| *H04L 29/08* | (2006.01) |
| *H04W 12/08* | (2009.01) |

(52) U.S. Cl.
CPC .............. *H04L 9/3247* (2013.01); *H04L 9/14* (2013.01); *H04L 9/3265* (2013.01); *H04L 9/3268* (2013.01); *H04L 63/0435* (2013.01); *H04L 63/0442* (2013.01); *H04L 63/126* (2013.01); *H04L 67/02* (2013.01); *H04W 12/0802* (2019.01)

(58) Field of Classification Search
None
See application file for complete search history.

(56) References Cited

U.S. PATENT DOCUMENTS

| | | |
|---|---|---|
| 5,003,597 A | 3/1991 | Merkle |
| 5,606,617 A | 2/1997 | Brands |
| 5,799,088 A | 8/1998 | Raike |

(Continued)

OTHER PUBLICATIONS

Xavier Boyen, Mesh Signatures: How to Leak a Secret with Unwitting and Unwilling Participants, 2007, Eurocrypt 2007, LNCS 4515, pp. 210-227 (Year: 2007).*

(Continued)

*Primary Examiner* — Luu T Pham
*Assistant Examiner* — Edward X Long
(74) *Attorney, Agent, or Firm* — Michael A. Springs; Moore & Van Allen PLLC; Jeffrey R. Gray

(57) ABSTRACT

Systems, computer products, and methods are described herein for an improved secure certificate system that utilizes multiple digital signatures, and in some cases multiple public keys within one or more certificates. The improved secure certificate systems allows for additional security by having multiple certification authorities validate the organization as the owner of the organization application (e.g., website, dedicated application, or the like), as well as allowing for the use of the multiple digital signatures and/or certificates to provide seamless verification of the organization application should one or more of the digital signatures and/or certificates become compromised. Moreover, security may be improved by utilizing multiple public keys to encrypt a session key for use in sending and receiving data.

20 Claims, 6 Drawing Sheets

(56) References Cited

U.S. PATENT DOCUMENTS

| | | | |
|---|---|---|---|
| 6,097,811 A | 8/2000 | Micali | |
| 6,108,788 A | 8/2000 | Moses et al. | |
| 6,134,327 A | 10/2000 | Van Oorschot | |
| 6,134,550 A | 10/2000 | Van Oorschot et al. | |
| 6,212,634 B1 | 4/2001 | Geer, Jr. et al. | |
| 6,237,096 B1 | 5/2001 | Bisbee et al. | |
| 6,304,974 B1 | 10/2001 | Samar | |
| 6,487,658 B1 | 11/2002 | Micali | |
| 6,636,968 B1 | 10/2003 | Rosner et al. | |
| 6,819,766 B1 | 11/2004 | Weidong | |
| 6,865,674 B1 | 3/2005 | Mancini et al. | |
| 7,103,774 B2 | 9/2006 | Wildish et al. | |
| 7,130,999 B2 | 10/2006 | Yasala et al. | |
| 7,315,941 B2 | 1/2008 | Ramzan et al. | |
| 7,383,434 B2 | 6/2008 | Wildish et al. | |
| 7,412,524 B1 | 8/2008 | Gupta et al. | |
| 7,580,521 B1 | 8/2009 | Spies et al. | |
| 7,971,240 B2 | 6/2011 | Guo et al. | |
| 8,116,451 B2 | 2/2012 | Johnson | |
| 8,457,307 B2 | 6/2013 | Vanstone | |
| 8,626,929 B2 | 1/2014 | Jiang et al. | |
| 8,627,085 B2 | 1/2014 | Kapoor | |
| 8,689,346 B2 | 4/2014 | Maes et al. | |
| 8,776,192 B2 | 7/2014 | Schiefelbein | |
| 8,850,288 B1 | 9/2014 | Lazier et al. | |
| 8,954,732 B1 | 2/2015 | Watsen et al. | |
| 9,240,884 B2 | 1/2016 | Brown | |
| 9,264,221 B2 | 2/2016 | Yung et al. | |
| 9,455,994 B1 | 9/2016 | Raman et al. | |
| 2001/0024501 A1 | 9/2001 | Furukawa | |
| 2003/0009694 A1 | 1/2003 | Wenocur et al. | |
| 2003/0014629 A1 | 1/2003 | Zuccherato | |
| 2003/0041110 A1 | 2/2003 | Wenocur et al. | |
| 2003/0079136 A1 | 4/2003 | Ericta et al. | |
| 2003/0081789 A1 | 5/2003 | Numao et al. | |
| 2003/0133566 A1 | 7/2003 | Soldera | |
| 2004/0037424 A1 | 2/2004 | Numao et al. | |
| 2004/0236953 A1 | 11/2004 | Merenne et al. | |
| 2005/0021969 A1* | 1/2005 | Williams | H04L 9/3268 713/176 |
| 2005/0033956 A1 | 2/2005 | Krempl | |
| 2005/0033957 A1* | 2/2005 | Enokida | H04L 63/0442 713/156 |
| 2005/0081038 A1 | 4/2005 | Arditti Modiano et al. | |
| 2005/0220095 A1 | 10/2005 | Narayanan et al. | |
| 2006/0155984 A1 | 7/2006 | Tsuchida et al. | |
| 2006/0212706 A1 | 9/2006 | Jiang et al. | |
| 2006/0274856 A1 | 12/2006 | Dunn et al. | |
| 2007/0074019 A1 | 3/2007 | Seidel | |
| 2007/0083757 A1 | 4/2007 | Nakano et al. | |
| 2007/0195950 A1 | 8/2007 | Kudelski et al. | |
| 2007/0206787 A1 | 9/2007 | Bell | |
| 2008/0034204 A1 | 2/2008 | Lakshminarayanan | |
| 2008/0162357 A1 | 7/2008 | Gerardi et al. | |
| 2008/0216147 A1 | 9/2008 | Duffy | |
| 2009/0310789 A1* | 12/2009 | Sie | H04L 63/0823 380/282 |
| 2010/0211787 A1 | 8/2010 | Bukshpun et al. | |
| 2011/0202755 A1* | 8/2011 | Orsini | H04L 63/029 713/151 |
| 2012/0246065 A1 | 9/2012 | Yarvis et al. | |
| 2013/0036303 A1 | 2/2013 | Himawan et al. | |
| 2013/0051551 A1 | 2/2013 | El Aimani | |
| 2013/0185152 A1 | 7/2013 | Aaron et al. | |
| 2013/0290701 A1 | 10/2013 | Takenaka et al. | |
| 2014/0032913 A1 | 1/2014 | Tenenboym et al. | |
| 2014/0059354 A1 | 2/2014 | Jiang et al. | |
| 2014/0189351 A1 | 7/2014 | Steely et al. | |
| 2014/0258724 A1 | 9/2014 | Lambert et al. | |
| 2014/0281477 A1 | 9/2014 | Nayshtut et al. | |
| 2014/0281502 A1 | 9/2014 | Chan et al. | |
| 2015/0058629 A1 | 2/2015 | Yarvis et al. | |
| 2015/0188704 A1 | 7/2015 | Takenaka et al. | |
| 2015/0287030 A1 | 10/2015 | Sagady et al. | |
| 2015/0381374 A1 | 12/2015 | Zombik | |
| 2016/0043870 A1 | 2/2016 | Avanzi | |
| 2016/0173287 A1* | 6/2016 | Bowen | H04L 9/321 713/156 |
| 2016/0182473 A1* | 6/2016 | Cignetti | H04L 63/0428 713/171 |
| 2016/0218881 A1 | 7/2016 | Adams | |
| 2016/0292447 A1 | 10/2016 | Lawrence et al. | |
| 2016/0337484 A1 | 11/2016 | Tola | |
| 2017/0012950 A1 | 1/2017 | Kim et al. | |
| 2017/0041132 A1 | 2/2017 | Nicholls | |
| 2017/0070485 A1 | 3/2017 | Kumar et al. | |
| 2017/0078094 A1 | 3/2017 | Olson | |
| 2017/0099269 A1 | 4/2017 | Robertson | |
| 2017/0180122 A1 | 6/2017 | Smith et al. | |
| 2017/0223529 A1 | 8/2017 | Schafer et al. | |
| 2017/0289137 A1 | 10/2017 | Pendarakis et al. | |
| 2018/0262345 A1 | 9/2018 | Frederick et al. | |
| 2018/0262472 A1 | 9/2018 | Frederick et al. | |

OTHER PUBLICATIONS

Lein Ham, Chu-Hsing Lin, Contract signature in e-commerce, 2011, Computers and Electrical Engineering 37 (2011) 169-173 (Year: 2011).*

Lein Harn, Chu-Hsing Lin, Contract signature in e-commerce, 2011, Computers and Electrical Engineering 37 (2011) 169-173 (Year: 2011).

Layered email encryption with multiple private keys on separate media; https://security.stackexchange.com/questions/46430/layered-email-encryption-with-multiple-private-keys-on-separate-media; Dec. 9, 2013 (Year: 2013).

Yao, Y., Yang, L.T. and Xiong, N.N., 2015. Anonymity-Based Privacy-Preserving Data Reporting for Participatory Sensing. IEEE Internet of Things Journal, 2(5), pp. 381-390. (Year: 2015).

How to decrypt a file encrypted under multiple public keys GPG; https://security.stackexchange.com/questions/117600/how-to-decrypt-a-file-encrypted-under-multiple-public-keys-gpg; Mar. 16, 2016 (Year: 2016).

Maurer, U.M. and Massey, J.L., 1993. Cascade ciphers: The importance of being first. Journal of Cryptology, 6(1), pp. 55-61. (Year: 1993).

Even, S. and Goldreich, O., 1985. On the power of cascade ciphers. ACM Transactions on Computer Systems (TOCS) 3(2), pp. 108-116. (Year: 1985).

* cited by examiner

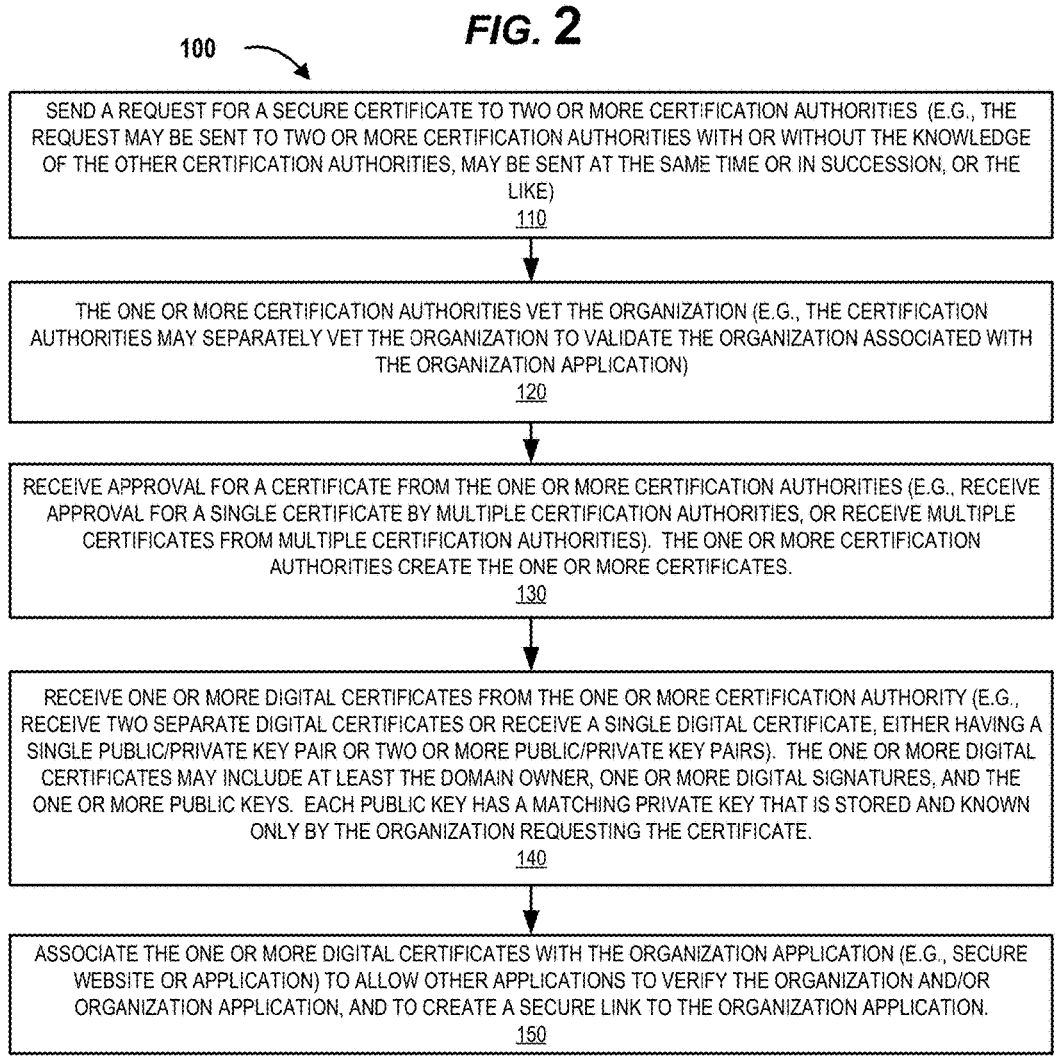

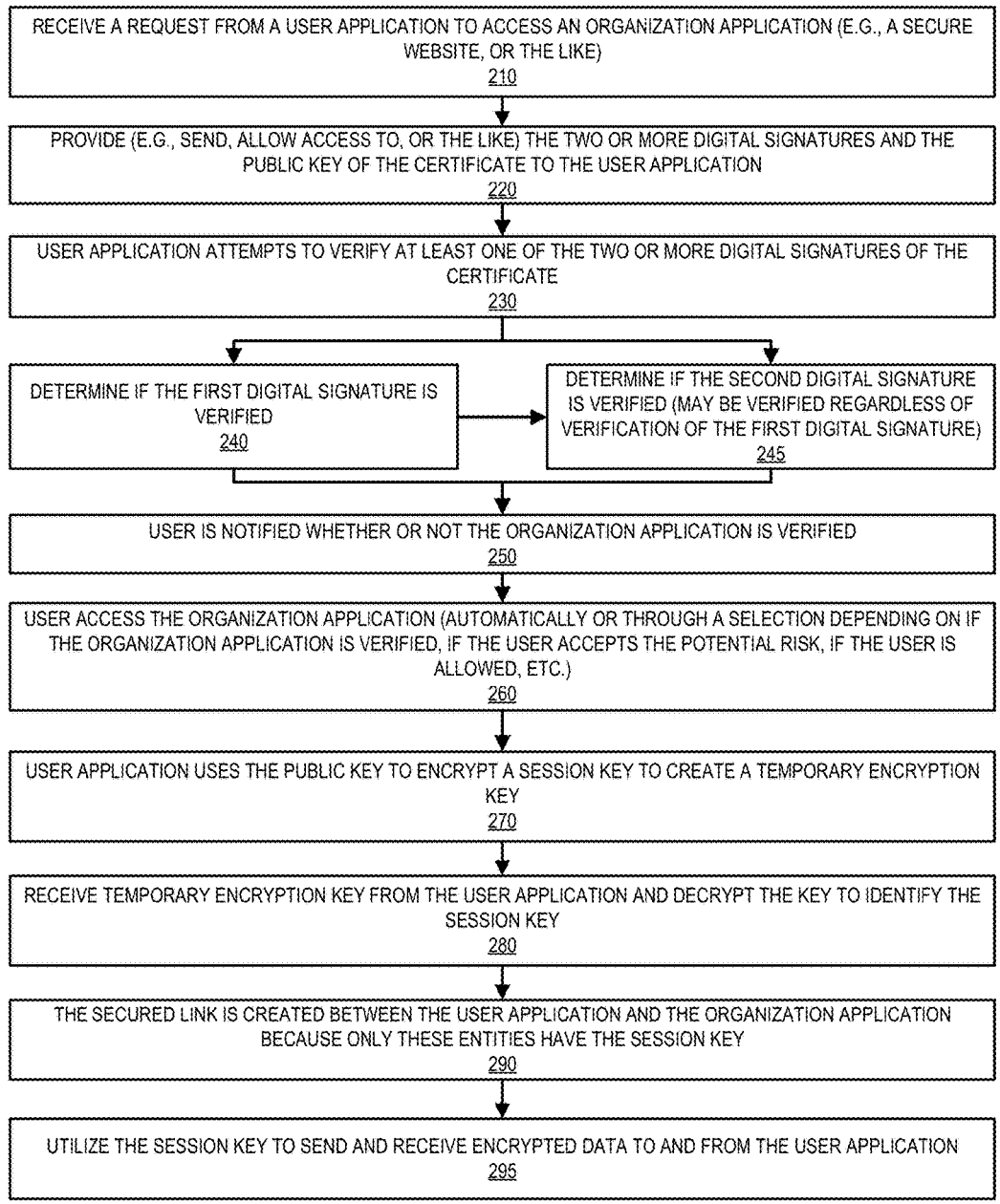

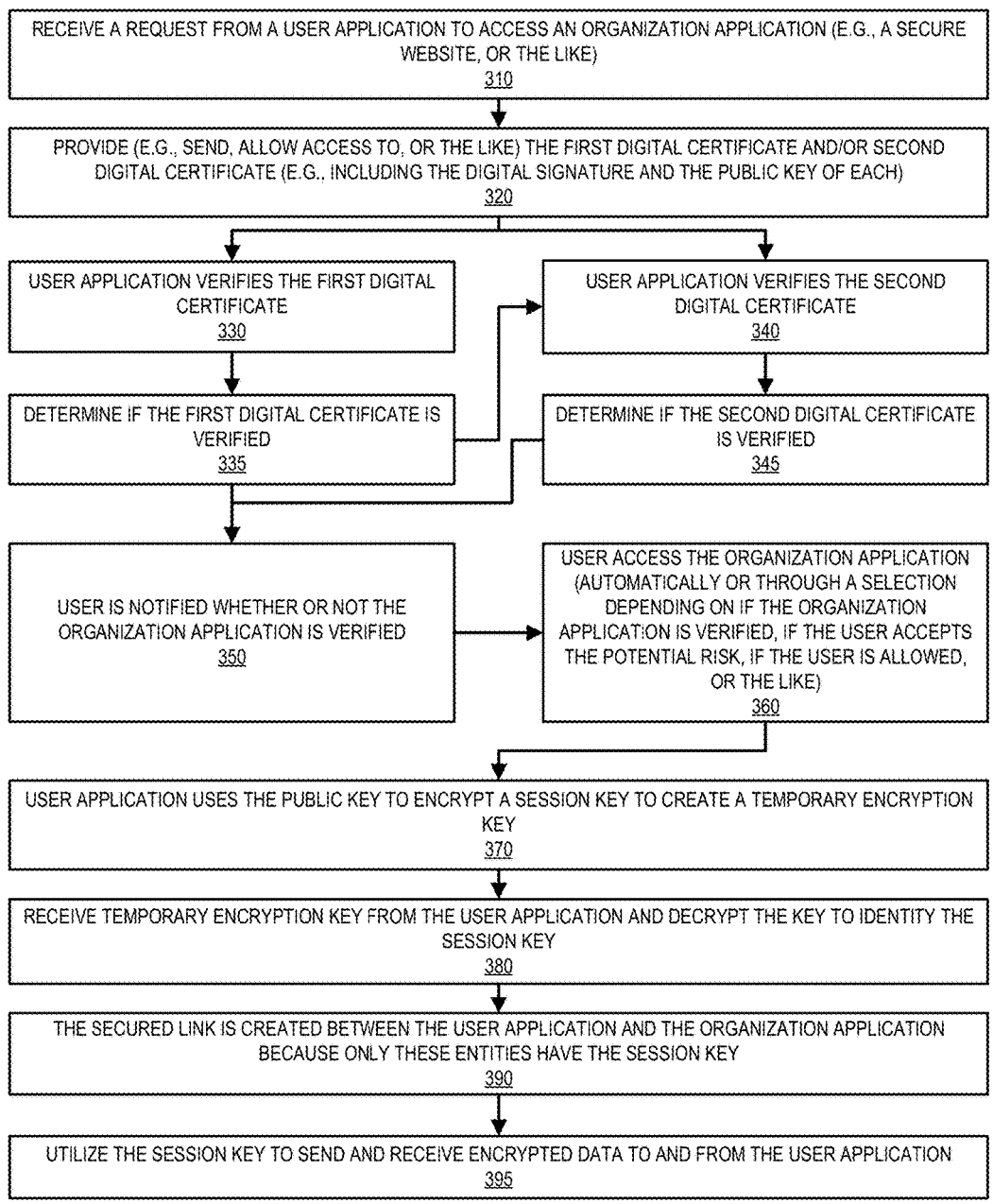

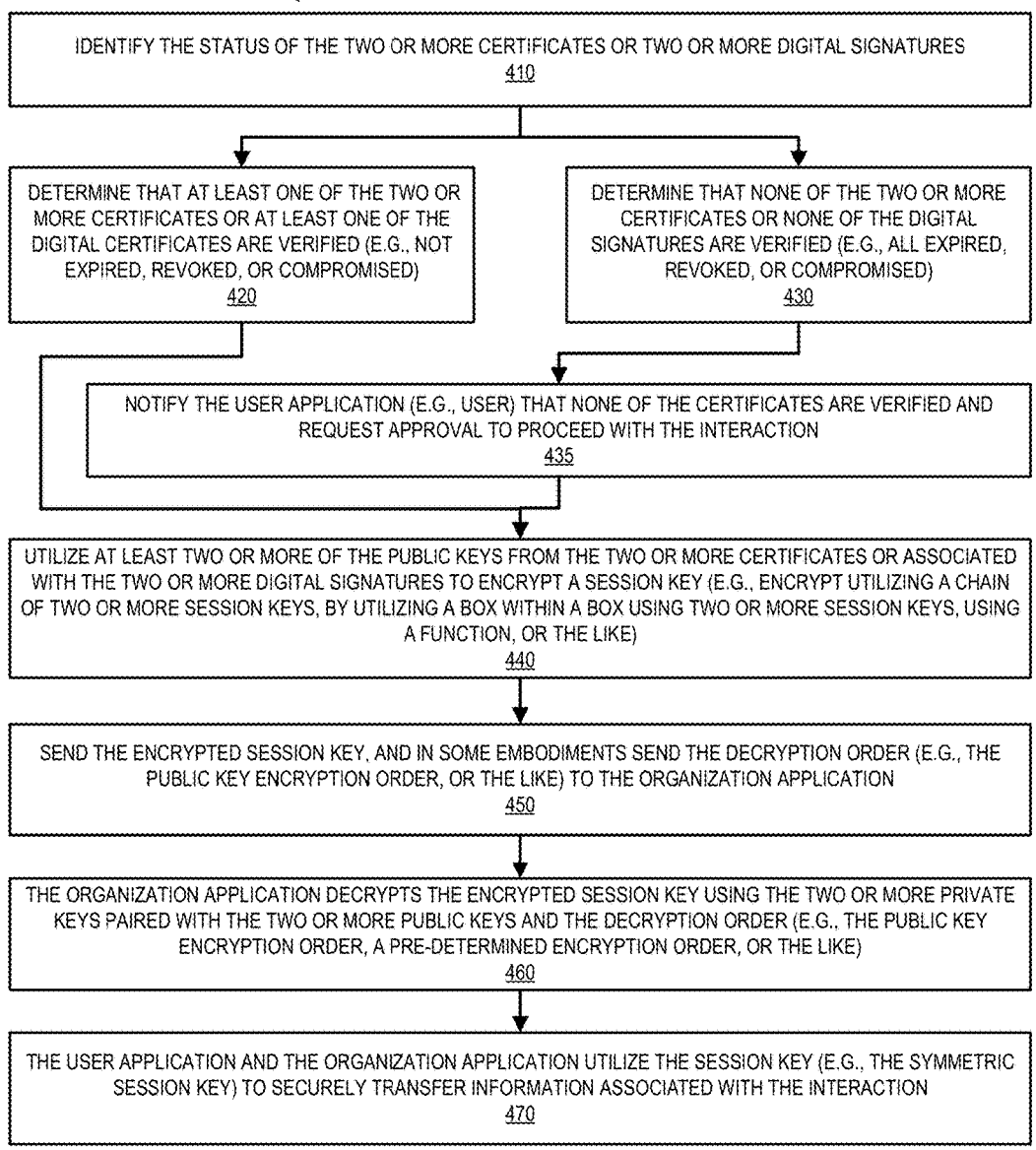

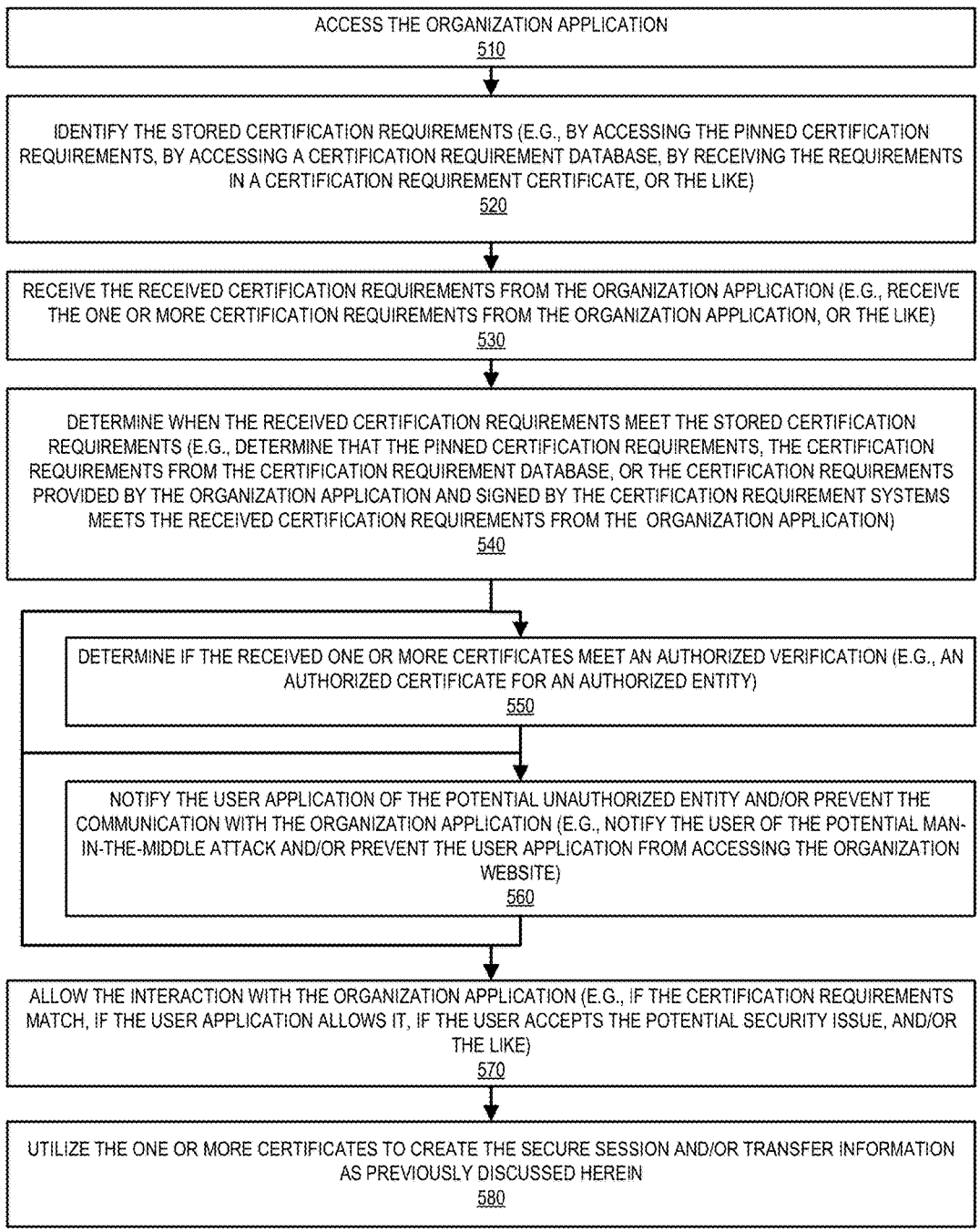

VERIFICATION SYSTEM FOR CREATING A SECURE LINK

FIELD

The present invention relates to utilizing multiple certificates and/or multiple certifying authorities to create an improved system and process for validating trusted applications and creating secure sessions with the trusted applications.

BACKGROUND

A certificate provided by a certification authority is utilized by a website to indicate the owner of the website and to provide a way to transmit information with the website, for example by creating a secure session for the transmission of encrypted information between the website and the web browser accessing the website. However, the certification authority and/or the certificate can become compromised with or without anyone becoming aware of the compromised certification authority and/or certificate for weeks, months, years, or the like.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for an improved secure certificate system that utilizes multiple digital signatures, and in some cases multiple public keys and corresponding private keys within one or more certificates, in order to verify the website or dedicated application and create a secure session. The improved secure certificate system allows for additional security by having multiple certification authorities validate the organization as the owner of the organization application (e.g., website, dedicated application, or the like), as well as allowing for the seamless replacement of digital signatures and/or public keys that have been, or may potentially be, compromised without interrupting the user's access to the organization application.

As will be discussed in further detail herein, an organization may request one or more certificates with two or more digital signatures and two or more public and private key pairs from two or more certification authorities, and associate the forgoing with the organization's application (e.g., website, dedicated application, or the like). As such, when a user application (e.g., web browser, dedicated application, or the like) accesses the organization application, the user application may be able to verify the owner of the website as being a trusted entity using any combination of one or more of the digital signatures in the one or more certificates. Moreover, if a particular digital signature (and thus, an associated public/private key pair or other encryption information used to create a secure session) becomes compromised (e.g., misappropriated by a third-party entity, exposed to the public, issued by an untrustworthy entity, or the like) and/or a certification authority associated with the digital signature (and thus, potentially the associated public/private key pair or other encryption information) becomes compromised (e.g., certification authority systems are illegally accessed, certification authority does not properly vet the organization, or the like) then the organization can remove the compromised digital signature, and continue to rely on one or more other digital signatures (and thus, one or more other public/private key pairs or other encryption information) in one or more certificates in order to continue to provide a secure organization application. Moreover, should a particular digital signature and/or a certificate become expired (e.g., through the failure of the organization to renew the digital signature and/or the certificate, or the like) then the organization can remove the expired digital signature and/or certificate, and continue to rely on one or more other digital signatures or certificates in order to continue to provide a secure organization application.

In addition to utilizing one or more digital signatures in one or more certificates to verify the organization application, the user application may utilize two or more public keys from two or more public and private key pairs associated with two or more digital signatures in one or more certificates to encrypt a symmetric session key for use in securely sending and receiving information between the user application and the organization application. The private keys are held in secret by the organization application (or other third party hosting the organization application), while the public keys are made available to the public. It should be understood that the two or more public keys can be utilized regardless of whether or not the two or more associated private keys have become compromised, or otherwise revoked or expired (e.g., because of the associated digital signature and/or certificate has expired); however, in some instances at least one public and private key pair may be required to be active (e.g., not compromised or expired) in order to create the encrypted session key. It should be further understood that the two or more public keys may be encrypted in a string, an embedded, or a function configuration and the encryption method and/or encryption order may be received from or sent to the organization application, or previously agreed to between the user application and/or organization application, in order to allow the organization application to decrypt the encrypted session key, and to send and receive information using the session key.

In addition to using multiple certificates, certification requirements may be utilized to identify potential compromised interactions between a user application and an organization application, and/or to identify unauthorized entities involved in the potential compromised interactions. In addition to the other benefits of utilizing two or more certificates described herein, two or more certificates may be utilized to prevent unauthorized entities from intercepting an interaction (e.g., communication, transaction, or the like) between a user application and an organization application and redirecting the interaction using a compromised or substitute certificate (e.g., a man-in-the-middle attack). When a user application interacts with an organization application, an unauthorized entity may intercept the initial communication and redirect the interaction between the user and organization using a compromised certificate from the organization application or using a substitute certificate generated by the unauthorized entity. By requiring two or more certificates it is unlikely that the unauthorized entity could compromise two or more of the certificates from the organization application and/or create two or more substitute certificates that could be verified. However, unless a user application knows the certification requirements for the organization application, the user application may not know if the certification requirements and/or one or more certificates that it is receiving is actually from the organization application or from an unauthorized entity trying to compromise the interaction. As such, the use of certification requirements allows the user application to identity potential compromised interactions with the organization application before the interaction is fully initiated and before a secure session is established. The certification requirements may include threshold requirements, such as a threshold number of certifications that require verification (e.g., at least two verified certificates, at least three verified certificates, or the like). The certification requirements may also include the certification authorities from which the certificates were verified (e.g., the specific entities that the organization uses to provide the certificates and/or a threshold number of verified certificates from different certification authorities). The certification requirements may further include the number of certificates, or minimum threshold number of certificates, provided by the organization entity. As such, the stored certification requirements may be compared by the user application (e.g., web browser) against received certification requirements in order to determine when an unauthorized entity may be trying to set up an interaction using certificates that do meet the certification requirements set up by the organization application 17 (e.g., a website). As will be discussed further herein, stored certification requirements may be stored by pinning certification requirements from the organization application when the user application first accesses the organization application, may be accessed through third party certification requirements systems, and/or may be included in certification requirement certificates provided by the organization application when the user application accesses the organization application.

Embodiments of the invention comprise systems, method, and computer program products for accessing secure applications provided by an organization. The embodiments of the invention comprise accessing an organization application, through an organization system or a third party system; accessing two or more digital signatures associated with the organization application, wherein the two or more digital signatures are included within one or more certificates on the organization application; attempting to verify at least one of the two or more digital signatures as being signed by a certification authority that is trusted; and receiving and sending information from and to the organization application after verifying the organization application using the at least one of the two or more digital signatures.

In further accord with embodiments of the invention, attempting to verify at least one of the two or more digital signatures comprises attempting to verify a first digital signature; failing to verify the first digital signature; attempting to verify a second digital signature; and verifying the second digital signature.

In other embodiments of the invention, attempting to verify at least one of the two or more digital signatures comprises attempting to verify a first digital signature; verifying the first digital signature; attempting to verify a second digital signature; and verifying the second digital signature.

In still other embodiments of the invention, the two or more digital signatures are included in a single certification.

In yet other embodiments of the invention, the two or more digital signatures are provided through two or more certificates each with separate digital signatures, and wherein the user application verifies at least one of the two or more digital signatures in the two or more certificates.

In further accord with embodiments of the invention, receiving and sending the information comprises receiving and sending information over a secure session. Embodiments further comprising identifying a public key associated with at least one of the two or more digital signatures within the one or more certificates when at least one of the two or more digital signatures are verified; creating a symmetric session key for the secure session with the organization application; encrypting the symmetric session key to create an encrypted symmetric session key using a public key from one or more public keys; sending the encrypted symmetric session key to the organization application, wherein the organization application utilizes a private key to decrypt the encrypted symmetric session key to identify the symmetric session key; and receiving and sending information from and to the organization application using the symmetric session key.

In other embodiments of the invention, the public key is associated with the two or more digital signatures.

In still other embodiments of the invention, the public key is from two or more public keys associated with the two or more digital signatures.

In yet other embodiments, the invention further comprises identifying the two or more public keys associated with the two or more digital signatures; wherein encrypting the symmetric session key to create the encrypted symmetric session key comprises encrypting the symmetric session key using the two or more public keys in a string configuration, in an embedding configuration, or in a function configuration; and wherein the organization application utilizes two or more private keys associated with the two or more public keys to decrypt the encrypted symmetric session key to identify the symmetric session key.

In other embodiments of the invention, the two or more digital signatures are verified and the order in which the two or more digital signatures are verified is provided to the organization application, and wherein the order in which the two or more digital signatures are verified is utilized to create the secure session between the user application and the organization application.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
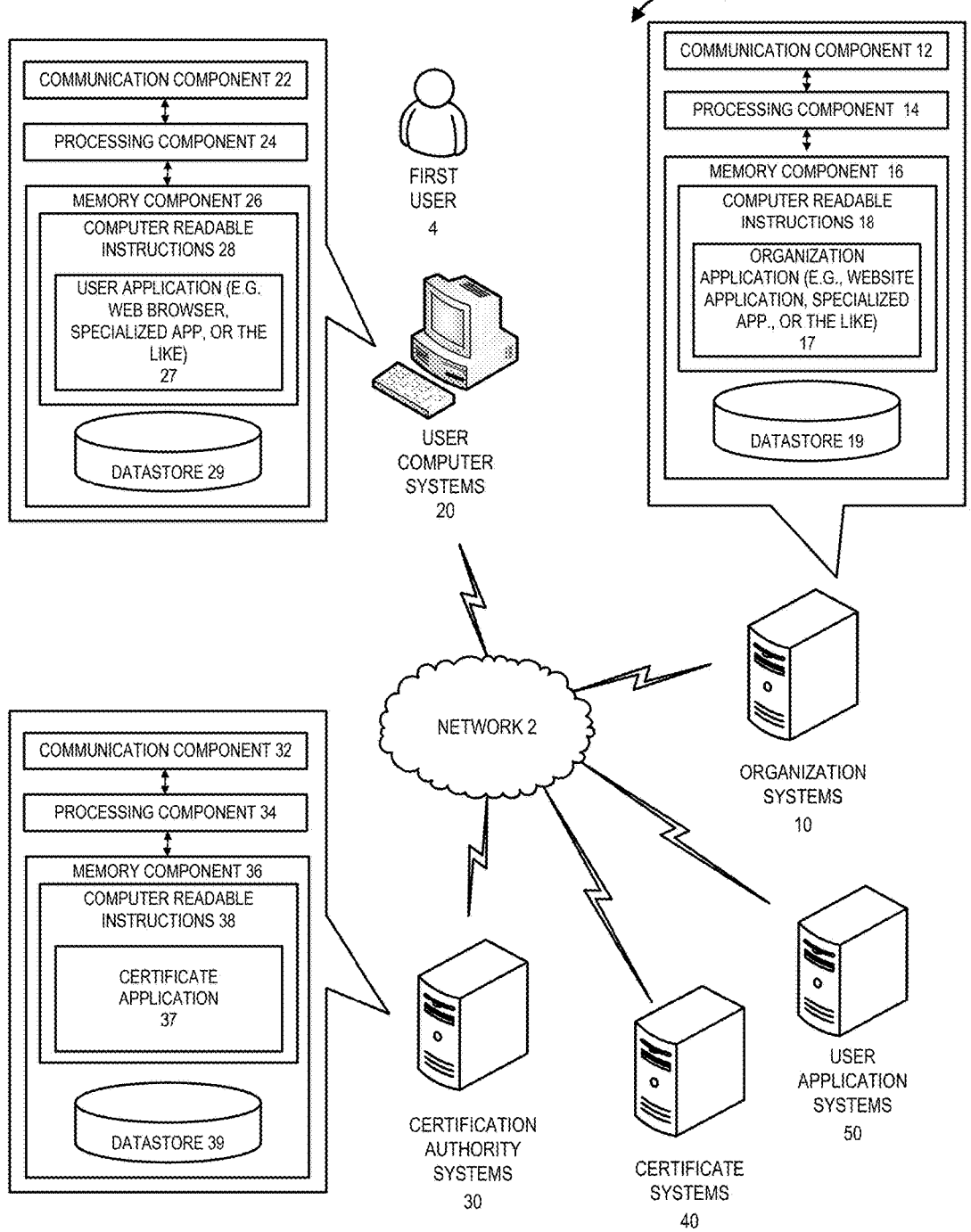

Having thus described embodiments of the invention in general terms, reference will now be made to the accompanying drawings, and wherein:

FIG. 1 illustrates a block system diagram of a secure certificate system environment, in accordance with embodiments of the invention.

FIG. 2 illustrates a process flow regarding how an organization requests and receives two or more certificates or two or more validations for a certificate and to use the same to create a secure session, in accordance with embodiments of the invention.

FIG. 3 illustrates a process flow regarding how an organization application is verified and a secure session is created utilizing a single certificate with multiple validations, in accordance with embodiments of the invention.

FIG. 4 illustrates a process flow regarding how an organization application is verified and a secure session is created utilizing multiple certificates, in accordance with embodiments of the invention.

FIG. 5 illustrates a process flow regarding how a secure session is created utilizing multiple public and private key pairs, in accordance with embodiments of the invention.

FIG. 6 illustrates a process flow regarding using verification requirements to determine potential compromising entities.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide for improving the security and confidence associated with verifying the ownership of secure applications accessed by a user, and for providing features that allow for the continuation of secure applications in case secure information associated with the secure application is potentially compromised. Moreover, the systems, methods, and computer program products disclosed also provide for identifying when potential compromising entities are in the middle of an interaction and/or listening to an interaction between a user and an organization. It should be understood that the present inventions disclosed herein provide a number of different ways to improve the security and confidence associated with accessing an organization application (e.g., website, dedicated application, or the like), which can only be implemented over the Internet in response to problems (e.g., security or the like) that only exist over the Internet.

FIG. 1 illustrates a secure certificate system environment 1, in accordance with embodiments of the invention. As illustrated in FIG. 1, one or more organization systems 10 are operatively coupled, via a network 2, to one or more user computer systems 20, one or more certification authority systems 30, one or more certificate systems 40, one or more application systems 50 (e.g., user application systems, or the like) and/or one or more other systems (not illustrated). In this way, the user 4 (e.g., one or more associates, employees, agents, contractors, sub-contractors, third-party representatives, customers, or the like), through a user application 27 (e.g., web browser, dedicated or specialized application, or the like), may access an organization application 17 (e.g., website, dedicated or specialized application, or the like) of the organization systems 10, and utilize the two or more certificates or a certificate with two or more digital signatures in order to verify the owner of the organization application 17, create a secure session with the organization application 17, and/or identify potential compromising entities involved in the interaction between the user and the organization. The secure session between the organization application 17 and the user application 27 allows the user 4 and the organization (e.g., merchant, another user, or other type of entity) to encrypt interactions (e.g., communications, exchange of information, transactions, or the like) between the user 4 and the organization.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the certification authority systems 30, the certificate systems 40, the application systems 50, or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the organization systems 10 comprise computer-readable instructions 18 stored in the memory component 16, which in one embodiment includes the computer-readable instructions 18 of the organization application 17 (e.g., secure website application, secure dedicated application, or the like). In some embodiments, the one or more memory components 16 include one or more data stores 19 for storing data related to the organization systems 10, including, but not limited to, data created, accessed, and/or used by the organization application 17. The organization couples the one or more certificates with the one or more digital signatures into the organization application 17, or otherwise allows access to the one or more certificates with the one or more digital signatures, in order to allow user applications 27 to verify the owner of the organization application 17, and in some instances create a secure session between the applications.

As illustrated in FIG. 1, users 4 may access the organization application 17, or other applications, through a user computer system 20. The user computer system 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the organization systems 10, the certification authority systems 30, the certificate systems 40, the application systems 50, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other apps that allow access to applications located on other systems, or the like. The user application 27 uses the one or more certificates with the one or more digital signatures to verify the owner of the organization application 17, and in some cases to create a secure session between the applications.

As illustrated in FIG. 1, one or more certification authority systems 30 may be utilized by the organization systems 10 and/or user computer systems 20 to create and/or check certificates associated with organization applications 17. As such, the certification authority systems 30 are operatively coupled, via a network 2, to the one or more organization systems 10, the user computer systems 20, the certificate systems 40, the application system, and/or other systems. The certification authority systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of organization systems 10, the user computer systems 20, the certificate systems 40, the application systems 50, and/or other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the certification authority systems 30 may have computer-readable instructions 38 stored in the one or more memory components 36, which in one embodiment includes the computer-readable instructions 38 of certificate applications 37 that allow the certifying authority to create, assign, track, and/or provide certificates to various organizations after validating the organizations, or the like as will be described herein.

Moreover, as illustrated in FIG. 1, the certificate systems 40, the application systems 50, and/or other like systems are operatively coupled to the organization systems 10, the user computer systems 20, and/or the certification authority systems 30, through the network 2. The certificate systems 40, the application systems 50, and/or other like systems have components the same as or similar to the components described with respect to the organization systems 10, the user computer systems 20, and/or the certification authority systems 30 (e.g., one or more communication components, one or more processing components, and one or more memory devices with computer-readable instructions of one or more applications, one or more datastores, or the like). Thus, the certificate systems 40, application systems 50, and/or other like systems communicate with the organization systems 10, the user computer systems 20, the certification authority systems 30, and/or each other in same or similar way as previously described with respect to the organization systems 10, the user computer systems 20, and/or the certification authority systems 30.

The certificate systems 40 may be one or more disparate systems and may or may not be third party systems that are used for storing the certification information provided by various certification authorities. The certification information may be the digital signature information for the certification authorities, public key information, compromised authorities or certificates, certification requirements, authorized certificates, or other information for the certificates, as will be described in further detail herein. This information may be stored by third parties to allow any user application 27 to access when the user application 27 receives or accesses a certificate from an organization application 17. Alternatively, the certification information may be stored by an application system 50, which may support the user application 27 (e.g., such a web browser application, or the like) that is stored on the user computer systems 20, but which may access outside systems for additional certificate information (e.g. the trusted certification authorities, compromised authorities or certificates, or the like). As such, in one example, the user application 27 may access a list of approved certification authorities (e.g., in the certificate systems 40, the user application systems 50, or the like) when verifying a certificate, and may create a secure link (e.g., secure session) with the organization application 17 in order to transmit secure data, as will be discussed in further detail later. In another example, the user application 27 may access stored certification requirements (e.g., stored by the third-party certificate systems 40, pinned in the user application systems 50 or in the user application 27, or included in certification requirement certificates provided by the organization application 17 and signed by the certification authority systems 30 and/or third-party certificate systems 40) to compare against received certification requirements from the organization application 17 in order to help determine that the interaction between the user application 27 and the organization application 17 has not been compromised, which will be discussed in further detail later.

Generally, when a user 4 visits an application, such as an organization application 17 (e.g., secure website), the user application 27, such as the user's web browser, requests a certificate (or in some cases multiple certificates for different purposes) from the secure website. The secure website then provides (e.g., allows access to or sends) the certificate with the certificate information to the user's web browser. The user's web browser checks the validity of the certificate by determining if the certification authority that signed off on the certificate is trusted. For example, the user's web browser checks the web browser's database (e.g., the user application system 50) for the certification authority associated with the certificate, checks a third-party database (e.g., certificate systems 40, application systems 50, or the like) that the web browser trusts for the certification authority, and/or checks a master list with certificate information to determine that the certificate and/or certification authority is a trusted authority and/or has not been compromised (e.g., the certificate or the certificate authority is not included on a list of compromised certificates or certificate authorities). As such, the user's web browser has verification that the secure website has been validated by a certification authority that is trusted, and confirms the identity of the owner of the secure website.

It should be understood that the certificates can be utilized for a number of different purposes, such as identification (e.g., domain, organization, extended validation, or the like), signing, transferring or allowing access to information, creating secure sessions, or the like. After the website is verified using the certificate, the user's web browser may send or receive non-encrypted data from the website. Alternatively, in some embodiments of the invention the one or more certificates with the one or more digital signatures used to verify the identity of the owner of the website may also be utilized to create a secure session. With respect to creating a secure session, the session may be created by utilizing public-private key pairs, symmetric keys, algorithms, quantum computing security, or other cryptography to create the secure session with or without the use of the certificate. Creating a secure session with a public-private key pair may be the most common way of creating a secure session. As such, in some aspects of the invention, the user's web browser generates a one-time unique session key (e.g., a symmetric session key) and encrypts the session key to create an encrypted key (e.g., encrypted symmetric session key) using a public key from the certificate on the secure website. The web browser then sends the unique encrypted key to the secure website. The secure website decrypts the unique encrypted key using the private key paired with the public key used to create the encrypted key, which only the secure website has (the certification authority may also have the private key) in order to read the unique encrypted key to identify the session key created by the web browser. As such, the user's web browser and the secure website have created secured link, and can send encrypted information between the two using the symmetric session key because only the user's web browser and the secure website have the symmetric session key. Communications made between the user browser and the secure website are encrypted with the unique session key since only the user's web browser and the secure website have the unique session key. In some embodiments of the invention, as will be described with respect to FIG. 5, multiple public and private key pairs may be utilized to encrypt, share, and decrypt in order to provide additional security when sharing the symmetric session key.

After the session is terminated the unique session key is deleted and/or returned to a pool of unique session keys to be used at a future point in time.

It should be understood that issues may arise in the process of using the certificate to verify the owner of the secure website and creating the secured link (e.g., the secure session). For example, the certificate authority may become compromised in that a compromising entity could access the certification authority systems 30 and begin to issue new certificates, or could get a hold of the private key associated with a certificate or a digital signature in the certificate. As such, the compromising entity could lure users 4 to applications (e.g., websites) with fake certificates and misappropriate the confidential information of the user 4, for example, by the user 4 trusting the site and voluntarily providing confidential information. Alternatively, the compromising entity could use the compromised encryption information to listen in, and/or redirect secure communications. For example, the compromising entity could use a private key to issue new certificates, to access session keys for the secure website using the compromised private key, or to create new private keys (e.g., a man-in-the-middle attack (MIM attack)). Consequently, specific certificates that have been previously issued may be revoked, or all of the certificates issued by a certificate authority that has been compromised may be revoked. Alternatively, certificates issued by a certification authority may be revoked, not because the certification authority systems 30 have been compromised, but because it is found that the certification authority itself does not properly perform the vetting process to validate a website and issue a new certificate.

Therefore, when a certification authority or a specific certificate becomes compromised, or the validity of the certificate is otherwise questioned, the certificate authority, a centralized certificate database entity, the secure website owner (e.g., host or actual owner), or the industry in general (e.g., trade magazines, regulating bodies, or the like) may revoke or call for the revocation of certificates from the certification authority (e.g., remove the certificate from the associated secure application). This revocation may be required because the certificate has been compromised (e.g., issued using misappropriated certificate information), but the revocation may also occur for valid certificates that the certification authority has issued in the past that may or may not be compromised. However, revoking a certificate means that the organization providing the secure website with the revoked certificate may no longer be able to provide a secure website, or may no longer be able to notify the user 4 that the website the user 4 is visiting is secure. As such, organizations face the dilemma of whether or not to revoke potentially compromised certificates because the organization is risking providing potentially compromised encryption information (e.g., a symmetric session key) if they do not revoke the certificate, or revoking the certificate and notifying users 4 that the website may not be secure, which reduces or eliminates potential users from accessing the website. While the organization is determining whether or not to revoke a certificate, or if the organization has revoked the certificate, then the organization may apply for a new certificate. Replacing a single certificate may take weeks or months; however, the replacement process may be more difficult when replacing multiple certificates (e.g., tens, hundreds, or thousands of certificates, or the like), such as when a certificate authority is shut down and an organization may be required to use a new certification authority to replace all of its certificates over multiple applications. In one embodiment, the present invention provides alternate ways for providing a secure application with improved security and flexibility should a certificate and/or encryption information (e.g., private keys, or the like) become compromised or potentially compromised.

FIG. 2 illustrates a process in which an organization may request a certification authority for a certificate for an organization application (e.g., a secure website, dedicated app, or the like). As illustrated by block 110 in FIG. 2, the organization sends a request (e.g., a certificate signing request (CSR)) for a secure certificate to one or more certifying authorities. As discussed throughout this disclosure, the certificate may have various purposes. However, in some aspects of the invention the certificate 1) indicates that the owner claiming ownership of the application (e.g., domain name of the website, or owner of the dedicated application) is actually the owner; and 2) provides encryption information for creating a secure session (e.g., a public key that can be utilized by others to create a secure session key, or other type of secure link).

In some embodiments the request may be for a single certificate with two or more certifications in the single certificate. In such cases the first certifying authority may provide a first digital signature on the single digital certificate, and the second certifying authority may later provide (or provide at the same time) a second digital signature on the same single digital certificate. As such, in some aspects of the invention the certificate may have a single type of encryption to create a secure session (e.g. single public key associated with a private key held by the organization, such as one single key pair for both digital signatures, or multiple public keys associated with multiple private keys held by the organization, such as one single key pair for each digital signature). This embodiment of the process is described with respect to a first certification authority and a second certification authority providing two digital signatures; however, it should be understood that any number of certification authorities may be utilized with any number of digital signatures and secure session encryption (e.g., any number of public/private key pairs, symmetric keys, or the like). In these instances when multiple certification authorities are signing a single certificate, the request (e.g., CSR) may be modified to include that the request is going to be signed by multiple certification authorities.

In other embodiments, the request (e.g., CSR) made by the organization may be for two or more separate certification authorities to validate the organization using two or more separate certifications. As such, the organization may make separate requests to two or more separate certification authorities, or may make a single request to the multiple authorities at the same time. As such, it should be understood that the two or more separate certification authorities may or may not know that multiple certifications are being created for the same organization application (e.g., secure website, or dedicated application) of the organization. Moreover, it should be understood that each separate certificate may have a different digital signature and different secure session encryption (e.g., different public keys with different private keys held by each organization, or other separate encryption information).

It should be further understood that regardless of the type of request (e.g. for a single certificate with multiple validation, or for separate multiple certificates) the request may be made by the organization through the organization system 10, or through a third-party hosting the organization application 17 for the organization.

Block 120 of FIG. 2 illustrates that the one or more certification authorities vet the organization to determine if the organization has control over the organization application (e.g., website domain), the legal status of the organization, the identity of the organization, if the organization application (e.g., website) is secure, and/or if the organization has the proper security measures in place. The vetting process may be performed by the certification authorities through the use of third-party information without the help of the organization. Moreover, the vetting process may include validating that the request was in fact made by the organization and obtain confirmation from the organization that the request is made (e.g., confirmation from an administrator that is known to be associated with the organization). In some embodiments of the invention, the certification authorities (e.g., two or more) will perform separate vetting processes to validate the organization, such that the multiple certificates or a certificate with multiple validations from multiple certification authorities receive separate vetting processes. As such, the organization may utilize one or more of the multiple certificates or one or more of the multiple validations (e.g., digital signatures and public keys) within a single certificate. In one embodiment the vetting process may utilize a "certification practice statement," which is published by the certificate authorities. The certification practice statement is a contract with specifications including how the vetting process is completed for each of the certification authorities. Some certification authorities may have more thorough vetting processes, such that certifications from one certification authority may be more trustworthy than another certification authorities.

As illustrated by block 130 in FIG. 2, the organization receives approval from two or more of the certifying authorities indicating that the organization is validated as the owner of the organization application (e.g., secure website, or the like). When a single certificate is being utilized the first certification authority may perform the vetting process first, and then after approval the request (e.g., CSR) may be sent directly by the first certification authority to the second certification authority (e.g., at the request of the organization). Alternatively, the first certification authority may send the request (e.g., CSR) back to the organization after it is vetted and approved by the first certification authority. Thereafter, the organization sends the request (e.g., CSR) to the second certification authority for vetting and approval. After the second certification authority (or a final certification authority for more than two) approves the certificate, either the first or second certification authority creates the digital certificate. Alternatively, a first portion of the digital certificate may be created by the first certification authority and a second portion of the digital certificate may be created by the second certification authority. When multiple certificates are used, the two or more certification authorities may approve the certificates separately and create the certificates separately.

In some cases the first and second certification authorities may know of each other. As such, each certification authority may view the entire contents of the certificate during the vetting process in order to generate a hash of the certificate contents and sign the certificate with the one or more digital signatures. In other cases the first and second certification authorities may not know of each other, and thus, the certificate may only be created after the two or more certification authorities have vetted the organization. Alternatively, portions of the certificate may be hidden to various certification authorities during the vetting process. As such, the vetting and approval process of one certification authority may not be influenced by the vetting process of another certification authority.

Block 140 in FIG. 2 illustrates that the organization (e.g., the organization systems 10) may receive one or more digital certificates from the one or more certification authorities. For example, the organization systems 10 may receive a first digital certificate from a first certification authority, a second digital certificate from a second certification authority, a third digital certificate from a third certification authority, or the like. Alternatively, and/or in addition, the organization may receive a single digital certificate with two or more digital signatures from the different certification authorities on the single digital certificate. The certificates (e.g., each of the multiple certificates and/or the single certificate with multiple digital signatures) may include the domain owner (e.g., the organization), a digital signature, encryption information (e.g., public and/or private keys, or the like), and other certificate information. It should be understood that the digital signature of the certification authority that is attached to the certificate may be encrypted in some embodiments of the invention. For example, the digital signature may be encrypted, for example by using a certification authority private key to which only the certification authority has access. In this way, anyone in the public may be able to read and/or identify the digital signature as belonging to the certification authority by applying a certification authority public key. This encryption of the digital signature helps to provide authentication of the digital signature in that the only way to read the digital signature of the certification authority is to use the public key provided by the certification authority or another trusted source. Alternatively, the public key attached to the certificate (e.g., can be otherwise described as the organization application public key) has an associated private key (e.g., can be otherwise described as the organization application private key) to which only the organization holding the certificate has access.

FIG. 2 further illustrates in block 150 that the organization couples the one or more certificates with the organization application 17 (e.g., secure website, dedicated application, or the like) of the organization. The one or more certificates are associated with the organization application 17 such that other applications (e.g., web browsers, or the like) that access the organization application 17 can access and/or receive the one or more certificates to verify the organization and/or create a secure session. In some cases, as will be discussed in further detail in FIG. 4, only one of the certificates may be used at a time to verify the organization application 17 when the user 4 (e.g., user application 27) accesses the organization application 17. Alternatively, multiple certificates (e.g., two, three, four, etc.) may be utilized when a user 4 (e.g., user application 27) accesses the organization application 17 (e.g., secure website), as will be discussed in FIG. 4. In other embodiments of the invention, the organization may associate a single certificate with one or more digital signatures with the organization application 17, such that when a user 4 (e.g., user application 27) accesses the organization application 17 one or more digital signatures may be utilized to verify the organization application 17, and the encryption information associated with the one or more digital signatures in the single certificate may be used to create the secure session as discussed in further detail in FIG. 3.

It should be understood that the certificates being described herein are discussed generally for application ownership verification. It should be further understood that applications may utilize a number of digital certificates for various reasons other than application ownership verification. As such, while organization applications 17 may utilize multiple digital certificates, each digital certificate is used for a different purpose. Alternatively, as described herein the one or more certificates with one or more digital signatures are being used for the same purpose, which is, verifying the owner of the organization application 17 (e.g., using multiple certificates and/or using multiple digital signatures within a single certificate). As such, the multiple certificates and/or digital signatures can be used in case the certificate and/or the certification authority becomes compromised, or to provide a higher level of confidence in security by requiring multiple certifications. Moreover, while the use of the multiple certificates and/or multiple digital signatures are discussed herein specifically related to the purpose of application ownership verification and/or to create a secure session (as described with respect to FIG. 5), it should be understood that the concepts of utilizing multiple certificates and/or multiple digital signatures from different certification authorities for the same purpose and/or for additional security can be applied to other uses of certificates.

It should be further understood that digital certificates from a single entity may include certificate chains that establish a digital chain of trust. A certification authority may issue a certificate from the root certification authority or from one of the intermediate certification authorities associated with the root certification authority. That is a single certificate may include a reference to one or more intermediate entities that are authorized to issue the certificate, which includes a chain back to the root certification authority. The certificate chain may include multiple entities; however, the entire chain still only operates as a single validation. As such, when a user application (e.g., web browser) accesses the certificate it may be a certificate issued by a root certification authority or it may be a certificate issued by an intermediate entity. In this way, the user application 27 (e.g., web browser) will check the entire chain of the certificate, that is, check that the one or more intermediate entities have a chain back to the root certification authority in order to validate that the entity issuing the certificate has the authority to validate the organization application 17. If the chain is broken (e.g., an entity in the chain is compromised) the entire chain is broken and the certification is not valid. That is, another entity in the chain cannot be used to validate the organization application 17 if one of the entities in the chain is compromised. Alternatively, in the present invention multiple validations of the organization application 17 are being performed, and if a certificate or a digital signature from one certification authority (or a certification chain) is compromised, another certificate or digital signature from another certification authority (or another certification chain) may be utilized to verify the organization application 17.

In other aspects of the invention the one or more certificates may also be utilized for additional security on top of digital signatures and/or a secure session (e.g., the public/private key pairs, or the like). For example, multiple certificates or multiple digital signatures in a single certificate may be required before a secure session is created in order to provide greater confidence in the security of the organization application 17. Additionally, the order in which the multiple certificates or multiple digital signatures in a single certificate are verified by the user application 17 may provide additional security, as will be discussed in further detail later.

FIG. 3 illustrates the process of verifying the organization and/or creating a secure link (e.g., secure session, or the like) between the user 4 (e.g., the user application 27) and the organization (e.g., the organization application 17, such as a secure website of the organization) utilizing a single certificate that has been validated by two or more certification authorities. As illustrated by block 210 in FIG. 3, the organization systems 10 receive a request from the user 4, such as from the user application 27 (e.g., user browser, or the like) to access the organization application 17 (e.g., secure website) of the organization. In one example, the request may be from a user 4 utilizing a web browser on the user computer systems 20 to access a secure website of the organization.

Block 220 of FIG. 3 illustrates that the organization systems 10 may provide (e.g., send, allow access to, or the like) the certificate to the user computer systems 20. As previously discussed, the single certificate includes two or more digital signatures and may include encryption information (e.g., one or more public keys, or other encryption method). For example, the certification authorities may have independently signed the certificate having the same encryption information (e.g., public key) or having independent encryption information (e.g., public keys for each digital signature) within the certificate.

As illustrated by block 230 in FIG. 3, the user application 27 (e.g., web browser) attempts to verify the certificate provided by the organization application 17 by checking the certificate information against public certificate information. It should be understood that the user application 27, such as the web browser, may be updated to be able to recognize a single certificate from a single certification authority, a single certificate from multiple certification authorities, and/or multiple certificates from multiple certification authorities depending on the type of one or more certificates the organization application 17 being accessed uses. As such, the user application 27 may be required to recognize the types and number of certificates used by the organization when accessing the organization application 17 and/or when receiving the one or more certificates, and/or the organization may be required to notify the user application 27 of the types and number of certificates along with certificate information when providing the one or more certificates to the user application 17.

When verifying the certificate, the user application 27 checks the dates (e.g., issue and/or expiration dates) of the certificate to determine if the certificate is still active (e.g., has not expired). The user application 27, also may check the one or more purposes of the certificate, such that the certificate is issued for the purpose associated with organization application 17 (e.g., identifying the owner of the organization application 17, or the like). The purpose of the certificate may include multiple purposes, such as a certificate for a website that includes encryption and/or digital signatures. The user application 27 then checks for compromised certificate information by checking the certificate with a certificate database, such as Online Certificate Status Protocol (OCSP) responder or a public certificate revocation list (e.g., located on a certificate systems 40, or the like), in order to determine if the certificate has been compromised and/or the certification authority that issued the certificate has been compromised. The public certificate information that is checked by the user application 27 may be stored by the user application's 27 owned database, by the application systems 50, by the certificate systems 40, or by some other third party system.

If the certificate and/or certification authority have not been compromised and/or revoked, and the date, purpose, and/or other aspects of the certificate are verified, then the user application 27 may further attempt verify that the digital signature is correct. In some embodiments the digital signature may be checked as being authentic by reviewing the digital signature, checking it against verified lists, verifying the digital signature using encryption, or the like. For example, the user application 27 may take the digital signature from the certificate and apply the certification authority's public key associated with the certification authority that signed the certificate to decrepit the digital signature. If the decrypted digital signature is the same as the expected public result for the certification authority the certificate is deemed verified. The checks of the digital signatures on the certificate may stop after one digital signature is verified, or multiple digital signatures may require verification before the certificate is deemed verified.

As illustrated by block 240, if the first digital signature certificate is verified, the process may move to block 250 if only one verification is required. However, if the first digital signature is not verified or if verification of multiple digital signatures is required, then the process may move to block 245. As illustrated by block 245, the second digital signature (or other digital signatures such at the third, fourth, fifth, or the like) may be verified. For example, the user application 17 may verify the certificate when one of the two or more digital certificates are verified. As such, if the user application 17 is unable to verify a first digital signature then the user application 17 may move to a second, third, or other digital signature. Alternatively, the user application 17 may only verify the certificate when two or more of the digital signatures are verified. Verifying multiple digital signatures may provide additional security and confidence for the user application 17 that the organization application 17 is owned by the organization listed in the certificate and is secure. In some embodiments of the invention, the digital signature used by the user application 27 to verify the organization application 17 may always be the first digital signature listed in the certificate. Alternatively, the digital signature utilized may be the $n^{th}$ digital signature on the certificate, which may change periodically to offer additional security associated with the verification of the organization application 17. Alternatively, the order of verification of multiple digital signatures being verified may be determined by either the user application 27 or the organization application 17 and shared with the other entity to provide additional security. As such, the order of verification of the one or more digital signatures may change for each interaction between various entities in order to provide additional security.

Block 250 of FIG. 3 illustrates that the user 4 may be notified regarding whether or not the certificate has been verified, such as through a verification indicator (e.g., notifying the user 4 whether or not the one or more certificates or one or more digital signatures have been verified). If the certificate is not verified then the user application 27 may notify the user 4 that the organization application 17 (e.g., website) may not be secure, or that the certificate, or one or more of the digital signatures within the certificate, could not be verified. The notification may be a pop-up notification, an icon (e.g., unlocked lock, or the like), e-mail notification, phone call, change in the display of the of the user computer system (e.g., provide a visual or sound notification), automatically closing out or preventing access to the organization application 17, removing or blocking the organization application 17 from the user computer systems 20, locking out the functionality of the user computer systems 20, or the like. For example, a business may want to prevent its employees from accessing organization applications 17 (e.g., websites) if the certificate for the organization applications 17 cannot be verified, and as such, the notification may include preventing the user 4 from using the user application 27 to access the organization application 17. In some embodiments the notification may only be a warning, and the user application 27 may still be allowed to access and/or use the organization application 17 at the user's own risk.

Alternatively, if the certificate is verified when the certificate, or one or more of the digital signatures, are verified, then the user 4 may be notified of the verification in the same or similar way as the user 4 is notified that the certificate, or the one or more digital signatures, is not verified (e.g., through a verification indicator, or the like). In some aspects of the invention the level of verification may be provided in the notification. For example, the organization application 17 may be verified by two or more digital certification authorities, and as such, there is greater confidence in the actual owner of the organization application 17. As such, in some aspects of the invention, the user 4 may be notified by the user application 27 that the certificate has been verified by multiple certification authorities, such as for example providing one or more verification indicators discussed above and in further detail below.

Block 260 in FIG. 3 illustrates that regardless of whether or not the certificate, or one or more of the digital signatures have been verified, the user 4 may be able to access the organization application 17. In some aspects of the invention, if the certificate, or one or more of the digital signatures, have been verified then user application 27 may automatically access the organization application 17. However, if the certificate, or one or more of the digital signatures, have not been verified then the user 4 may be required to provide an indication that the user 4 is aware of the potential security issues with respect to the organization application 17 before the user application 27 accesses the organization application 17. For example, the user 4 may have to agree to a notification of the potential security issues (e.g., click through acceptance, or the like).

FIG. 3 further illustrates in block 270, that in order to create the secure link (e.g., session) between the user application 27 and the organization application 17, the user application 17 may use the encryption information in the certificate. In some embodiments, the encryption information in the certificate is the public key that is used to create an encrypted session key (e.g., an encrypted symmetric session key that is decrypted using an associated private key). It should be understood that the encrypted session key may be an ephemeral encrypted session key that is temporary and discarded after it is used. In the embodiment illustrated in FIG. 3 the encrypted session key is created based on one or more of the public keys within the certificate that has been signed by the two or more certification authorities. For example, the certificate may have a single public key that is used regardless of the number of certification authorities that validated the certificate. Alternatively, each of the digital signatures within the single certificate may have a different public key, and as such, the public key used to create the encrypted session key may be any one of the public keys associated with any of the digital signatures that have been verified. In some aspects of the invention, the public key utilized may be the public key associated with the first digital certificate verified by the user application 27. Alternatively, the public key utilized may be the public key associated with an $n^{th}$ digital signature verified, which may change periodically to offer additional security associated with the creation of the session. The additional security may be provided because an entity trying to access the session between the user application 27 and the organization application 17 will not know which public key (and thus which private key) is being used to create the session key.

As illustrated by block 280 in FIG. 3, the organization system 10 receives the encryption information (e.g., the encrypted session key) from the user application 17 and decrypts the encryption information (e.g., the encrypted session key using the private key stored by the organization) to identity the session key.

Block 290 in FIG. 3, illustrates that a secure link is created between the user application 27 and the organization application 17 because only the user application 27 and the organization application 17 have the encryption information (e.g., the symmetric session key that has been created, sent, and decrypted). As such, as illustrated by block 295 the encryption information (e.g., the symmetric session key that only the user application 17 and organization application 27 have) is utilized by the organization application 17 to send and receive encrypted information to and from the user application 27, and is further utilized by the user application 27 to send and receive encrypted information to and from the organization application 17. The symmetric session key is utilized by the entities to read the encrypted information that is sent and received between the entities.

FIG. 4 illustrates another embodiment of the invention in which instead of utilizing a single certificate that has been validated by multiple certification authorities, the organization utilizes two or more certificates from different certification authorities in order to provide a more secure organization application (e.g., website) and/or reduce issues associated with compromised or revoked certificates and/or compromised certification authorities.

Block 310 of FIG. 4 illustrates that a request is received from a user application 27 to access an organization application 17, as was previously discussed with respect to block 210 of FIG. 3. In response, as illustrated by block 320 in FIG. 4, one or more certificates (e.g., a first certificate, or the like) is provided by the organization application 17 to the user application 27. The first certificate includes the first digital signature and the first encryption information (e.g., first public key), as well as the other first certificate information discussed herein (e.g., certificate issue date, certificate expiration date, certificate purpose, or the like).

Block 330 of FIG. 4 illustrates that the user application 27 attempts to verify the first certificate the same way as was previously discussed with respect to block 230 of FIG. 3. As such, the user application 27 will determine if the first certificate is active (e.g., not expired), if the digital signature is trusted (e.g., is signed by the certification authority), if the purpose of the certificate meets the organization application 17. As illustrated by block 335, if the first certificate is verified (e.g., the digital signature is from a trusted certificate authority, and the other certificate information is correct, and the certificate is not expired) the organization application 17 may be verified and the process may move to block 350 which illustrates that the user 4 is notified that the organization application 17 is secure. Alternatively, if the first digital certificate is expired, compromised, revoked, or the like, or if the user application 27 and/or the organization application 17 requires additional verification of multiple certificates, the process may move to block 340 in FIG. 4.

As illustrated by block 340 in FIG. 4, the user application 27 attempts to verify the second certificate (and/or additional certificates) in the same way as described above with respect to block 330 of FIG. 4 and block 230 of FIG. 3. It should be understood that the first certificate, second certificate, and/or other certificates may be verified at the same time or may be verified consecutively. As illustrated by block 345, if the second certificate is verified (e.g., the digital signature is from a trusted certificate authority, and the other certificate information is correct) the organization application 17 may be verified and the process may move to block 350 which illustrates that the user 4 is notified that the organization application 17 is secure, for example, through a verification indicator, which was briefly discussed above and which is discussed in further detail below. Alternatively, if the second certificate is not verified and/or if the user application 27 and/or organization application 17 requires additional verification certificates, then process may move to additional verification steps (not illustrated) for verifying additional certificates. In some embodiments of the invention, the certificate used by the user application 27 to verify the organization application 17 may always be the first certificate listed on the organization application 17. Alternatively, the certificate may be the $n^{th}$ certificate on the organization application 17, which may change periodically to offer additional security associated with the verification of the organization application 17. Alternatively, the order of verification of multiple digital signatures being verified may be determined by either the user application 27 or the organization application 17 and shared with the other entity to provide additional security. As such, the order of verification of the one or more certificates may change for each interaction between various entities in order to provide additional security. As illustrated by block 350, and as previously discussed with respect to block 250 of FIG. 3, the user application 27 may be notified regarding whether or not the first certificate, second certificate, and/or multiple certificates have been verified, such as through a verification indicator, which will be described in further detail later.

Block 360 of FIG. 4, as previously discussed with respect to block 260 of FIG. 3, illustrates that the user 4 may access the organization application 17 regardless of whether or not the organization application 17 is validated. As such, the user application 27 may automatically access the organization application 17 if the one or more certificates have been verified; however, the user 4 may access the organization application 17 even if the one or more certificates have not been verified (with or without user acknowledgement) in the same way as previously discussed with respect to block 260 in FIG. 3.

As illustrated by block 370 in FIG. 4, and as previously discussed with respect to block 270 in FIG. 3, the user application utilizes the encryption information (e.g., the public key) from the certificate in order to create an encrypted session key (e.g., an encrypted symmetric session key). For example, a session key (e.g., a symmetric session key) is created by the user application 17, and then the user application 17 encrypts the session key using the public key to create the encrypted session key. It should be understood that the user application 27 may utilize the public key of the any of the certificates that have been verified (e.g., the $1^{st}$ public key, $2^{nd}$ public key, $3^{rd}$ public key, or the like). In some instances the user application 27 may utilize the public key from the first certificate that has been verified. Alternatively, the user application 27 may use the public key from an $n^{th}$ certificate that has been verified. As previously discussed with respect to block 270 in FIG. 3 the public key utilized may change in order to provide an additional layer of security for the session. For example, each time the entities enter into a new interaction (e.g., for each new session), a different public/private key pair may be utilized to securely share the symmetric session key between the entities.

As illustrated by block 380 in FIG. 4, and as previously described with respect to block 280 in FIG. 3, regardless how the encryption information (e.g., the encrypted session key) has been determined, the organization application 17 receives the encryption information (e.g., encrypted session key). The organization can then decrypt the encryption information (e.g., the encrypted session key) to identify the session key (e.g., a symmetric session key). It should be understood that the organization application 17 may need to know what encryption method was used in order to use the proper decryption method. For example, in order to decrypt an encrypted session key provided to the organization application 17 by the user application 27, the organization application 17 needs to know what public key and algorithm was used (e.g., what certificate with a single public key and/or what public key from multiple public keys within a single certificate was used) in order to determine the proper associated private key and algorithm for decryption. As such, when the user application 27 provides the encrypted session key to the organization application 17 an encryption key identifier may be provided that illustrates what encryption was used (e.g., first, second, third, etc. certificate and/or first, second, third, etc. public key, or the like). Alternatively, in some embodiments of the invention the user application 27 and the organization application 17 may have previously agreed to what public key would be used (and thus what associated private key to use) for decryption.

Block 390 of FIG. 4, like block 290 of FIG. 3 illustrates that the secured link is created between the organization application 17 and the user application 27 because only these two entities have the encryption information (e.g., the symmetric session key). Moreover, as illustrated by block 395 in FIG. 4, like block 295 in FIG. 3, the encryption information (e.g., the symmetric session key) is utilized to send encrypted data between the organization application 17 and the user application 27. It should be understood typically the public/private key pair is used to share the encrypted session key between the entities; however, instead of using the public/private key pair to continue to send the additional information, the symmetric session key is used because it is much faster (e.g., 100×, 1000×, or the like faster) than using a public/private key pair.

FIGS. 3 and 4 were described above in relation to verifying the organization application 27, which is how typical interactions between entities are undertaken. However, it should be understood that in addition to authenticating the owner of the organization application 27, the user 4 and/or the user application 17 may be authenticated in the same way (e.g., using one or more certificates and/or one or more digital signatures), similar ways, or other authentication means (e.g., user ID and password).

FIGS. 3 and 4 were further described as providing a notification to the user, through the use of a verification indicator, regarding whether or not the verification of the organization application 27 occurred. It should be understood that the one or more verification indicators, as generally discussed above, may be one or more icons (e.g., one or more security locks, keys, key chains, or other logos) indicating that multiple certificates and/or digital signatures have been verified. The verification indicators may be provided in the user application 27 interface. Other verification indicators may be provided by the URL bar in the user application 27 interface, such as by changing color (e.g. green indicating multiple certificates and/or digital signatures are verified, yellow for a single certificate and/or digital signature verified, and red when none of the certificates and/or digital signatures are verified, or other like indicator). In one example, when two certificates or digital signatures are verified, the verification indicator may be two icons (e.g., two locked locks, a lock with two keys, two keys, or other like verification indicator). In another example, when three certificates or digital signatures are verified the verification indicator may be three icons (e.g., three locked locks, a lock with three keys, or other like verification indicator). Moreover, in some aspects of the invention the verification indicator may indicate how many certificates or digital signatures are being used to create the secure session, and/or indicate how many of the certificates or digital signatures have been verified. For example, if three certificates or digital signatures are being used the verification indicator may illustrate three icons (e.g., three locks), but if only two of the certificates or digital signatures are verified and one is not verified then the verification indictor may illustrate that only two icons are secure (e.g., two locked locks an one unlocked lock). In still other example, the verification indicator may be locked lock with a number located therein indicating how many certificates were verified (e.g., a 2 for two certificates, a 3 for three certificates, or the like).

In other aspects of the invention, regardless of the number of certificates and/or digital signatures that are verified, the user 4 may have no idea how many certificates were used or that any certificates and/or digital signatures have been found to be unverified (e.g., expired, compromised, revoked, or the like). As such, as long as one certificate and/or digital signature is verified by the user application 17 the user 4 may access the organization application 27 without ever knowing that one or more of the certificates and/or digital signatures are expired, compromised, revoked, or the like. As such, in some cases using the two or more digital signatures in one or more certificates may be a seamless process without the user 4 ever being aware how the organization application 27 is verified.

It should be further understood that the embodiments of the invention have been described as using a single public key from the multiple digital signatures and/or multiple certificates in order to create the secure session between the user application 27 and the organization application 17. However, is should be understood that in some embodiments of the invention two or more public keys may be required in order to create the secure session. For example, the two or more public keys may be used to create two or more session keys, all of which may be required in order to send and receive encrypted data between the user application 17 and the organization application 27. Moreover, as will be described in further detail with respect to FIG. 5, two or more public and private key pairs from the one or more certificates associated with the two or more digital signatures from the two or more certification authorities may be utilized to improve security. As such, even if one of the certificates/digital signatures/public-private key pairs is compromised, then the other one or more certificates/digital signatures/public-private key pairs are still secure, and as such, the session is still secure. Moreover, the invention has been generally described as using public/private key pairs to create a secure session. Alternatively, it should be understood that other types of encryption information and systems may be utilized, and thus substituted for the public/private key pairs described herein, and work in the same or similar way to create a secure session between the user application 27 and the organization application 17.

The embodiments of the present invention provide improvements over the use of a single certificate having a single digital signature validated by a single certification authority. For example, utilizing two or more certificates or two or more digital signatures in a single certificate provides protection against an unknown compromise of one certification authority since there are one or more additional certification authorities that have validated the organization application 17. Additionally, when the organization becomes aware of a certification authority (or specific certificate) that has become compromised, the organization may revoke a certificate (or single digital signature) associated with the compromise and utilize one or more additional certificates and/or digital signatures to provide trust and security for the organization application 17 while the compromised certification authority, certificates, and/or digital signatures are replaced.

The present invention provides additional improvements in that if a particular user application 27 (e.g., web browser, or the like) decides to not trust a particular certification authority (e.g., the user application 27 does not like the vetting process of the certificate authority) then the organization application 17 still provides trust and security for interactions with the user application 27 as long as the other certification authorities validating the organization application 17 are still trusted by the user application 27.

Furthermore, by having multiple validations from multiple certification authorities, the organization is able to report and/or revoke individual certificates and/or digital signatures when the organization suspects and/or becomes aware that they are compromised because the organization has other certificates and/or digital signatures that are still valid.

Not only do the multiple certificates and/or digital signatures provide continued trust for an organization application 27, but when public/private key pairs are used as the encryption method, the multiple private/public key pairs may be utilized to add additional layers of security when transmitting the session key for the interactions. FIG. 5 provides a process flow regarding how a secure session is created utilizing multiple public and private key pairs, in accordance with embodiments of the invention.

As illustrated by block 410 of FIG. 5, when creating the secure session with the organization application 27, the user application 17 identifies the status of two or more of the digital signatures and/or two or more of the certificates, as was previously discussed herein (e.g., check if the certificate and/or digital signatures are expired, compromised, revoked, or the like).

As illustrated by block 420 in FIG. 5, a determination is made that at least one of the two or more certificates, or at least one of the digital signatures are verified (e.g., not expired, revoked, and/or compromised). When at least one is verified the process may move to block 440. It should be understood that even when one certificate or digital signature is verified, it could still be compromised by a compromising entity without the user application 27, the organization application 17, or another entity knowing that it has been compromised. Alternatively, as illustrated by block 430 a determination may be made that none of the two or more certificates, or none of the two or more of the digital signatures are verified (e.g., each are expired, compromised, and/or revoked). In this case, the process moves to block 435, which illustrates that the user 4 or user application 27 is notified (e.g., through a verification indicator, pop up notification, or the like) that none of the certificates or none of the digital signatures have been verified. In some instances the user application 27 may not allow the user 4 to proceed with the interaction with the organization application 17, or alternatively, the user application 27 may allow the interaction to continue (e.g., if the user 4 agrees to proceed, or the like).

As illustrated by block 440 in FIG. 5, after at least one of the two or more certificates or one of the two or more digital signatures have been verified, or after the user 4 is notified that none of the certificates or digital signatures have been verified (and the user 4 agrees to proceed, or the like) the multiple certificates or digital signatures may be used to create the secure session. As such, the user application 17 may utilize two or more public keys from the two or more certificates, or associated with the two or more digital signatures within a single certificate, to encrypt a session key (e.g., symmetric session key) that was created by the user application 27 for the secure session. In some instances the two or more public keys may be utilized to encrypt the session key in a string configuration, in an embedded configuration, or in a function configuration. With respect to the string configuration, the two or more public keys may be used to encrypt a portion of the session key. As a simple example, the session key may have six numbers (in reality the session key has tens, hundreds, thousands, or the like characters), such that the first three numbers are encrypted using a first public key and the second three numbers are encrypted using the section public key. Alternatively, with respect to the embedded configuration the first public key may be utilized to encrypt the entire session key (e.g., all six numbers in the example, or tens, hundreds, or thousands of characters in actuality) to create a first encrypted key, while the second session key may be utilized to encrypt the first encrypted session key to create a second encrypted key, such that there are two layers of encryption (e.g., a locked box within another locked box, and/or within additional locked boxes). With respect to the function configuration, the two or more public keys may be utilized to encrypt independent portions of the session key or individual session keys, and a mathematical function (e.g., exclusive or, or other like function) is utilized to combine the independent portions of the session key or individual session keys to create the encrypted symmetric session key that is sent to the organization application 17. As such, it should be understood, that should one or more of the certificates or digital signatures either be expired, compromised, or revoked, it is unlikely that a compromising entity has all the private keys associated with the public keys used to encrypt the session key. As such, while a compromising entity may have a single private key, it would only be able to access a portion of the session key with respect to the string configuration, potentially a single layer of the session key with respect to the embedded configuration, and none of the session key with respect to function configuration.

By utilizing multiple public keys (associated with different multiple certification authorities) to encrypt the session key, the user application 27 reduces the risk of a compromising entity using a single compromised private key (or multiple private keys from a single compromising entity) to decrypt the encrypted session key and listen into conversations between the user application 27 and the organization application 17 (e.g., a man-in-the middle attack, or other like attack).

As illustrated by block 450 in FIG. 5, the user application 27 sends the encrypted session key (e.g., encrypted with two or more private keys) to the organization application 17. In some instances the user application 27 also sends the encryption order (e.g., the public key encryption order, or the like) to the organization application 17 so that the organization may decrypt the session key. In other embodiments of the invention, the user application 27 and organization application 17 may have previously agreed to the encryption order, for example, a private algorithm that determines the order based on the time of the encryption, a pre-agreed to order, or other like agreed upon encryption agreement. Alternatively, when the organization application 17 sends or allows access to the one or more certificates it may provide the desired encryption order to the user application 17.

Block 460 illustrates that the organization application 17 decrypts the encrypted session key using the encryption order and the private keys associated with the public keys used in the encryption process. For example, the organization application 17 will decrypt each portion of the session key if it was encrypted using the string configuration. Alternatively, the organization application 17 will decrypt each embedded layer of the session key if it was encrypted using the embedded configuration. Otherwise, the organization application 17 will decrypt the encrypted session key using each private key and the function that was used to encrypt the session key.

As illustrated by block 470 in FIG. 5, the user application 17 and the organization application 27 will send and receive information using the session key that only these entities have.

It should be understood that regardless of whether or not the certificates or digital signatures have become expired, compromised, and/or revoked, the process of FIG. 5 allows for improved security of transmitting data (e.g., a session key) over the Internet. It should also be understood that any number of public keys may be utilized to encrypt the session key. For example, in one aspect of the invention one public/private key pair may be active while the other public/private key pairs may be revoked or compromised. In other examples, three public and private key pairs may be utilized, in which one public/private key pair may be active, while the other two may be revoked or compromised. In still other embodiments, all of the three or more public/private key pairs may revoked or compromised, and the session key may be transmitted securely because it is unlikely that a compromising entity has compromised all of the private keys.

It should be further understood that instead of encrypting the session key using just the string configuration, just the embedded configuration, or just the function configuration, two or more of the configurations may be utilized to create the encrypted session key. It should be understood that other encryption configurations may be used to encrypt the session key using multiple public and private key pairs in order improve the security of the interaction between the user application 27 and the organization application 17.

In other embodiments of the invention, the organization application may create a self-signed certificate or self-signed digital signature, or otherwise create its own encryption information, such as a self-signed or self-created public and private key pair. A self-signed certificate or digital signature may be the same as a certificate or digital signature generated by a certificate authority; however, since it is self-signed (i.e., not verified by a certification authority) it is typically not used by a user application 27 (e.g., web browser) to verify the organization application 17, and in fact typically may be an indication that the organization application 17 may not be secure. A self-signed certificate or digital signature may be created by the organization application 27 through the use of a hardware security module (HSM), openSSL, Java, or the like. It should be understood that even though the self-signed certificate or digital signature may not be trusted for verification purposes, the user application 27 may still utilize the encryption information (e.g., a self-signed or self-created public and private key pair, or the like) associated with the self-signed certificate or digital signature in order to encrypt the session key. For example, with respect to FIG. 5 discussed above, the user application 27 may utilize one or more public keys that are associated with a certificate or digital signature from a certification authority. These one or more public keys may be verified or may be unverified (e.g., expired, revoked, and/or compromised) by the user application 27. Regardless, the one or more public keys associated with a certificate or digital signature from a certification authority may be utilized by the user application 27 along with a public key (or other encryption information) from a self-signed certificate or digital signature from the organization application 17 to encrypt the session key as was described with respect to FIG. 5 (e.g., using two or more public keys to encrypt the session key). In this way, even if the a compromising entity has the one or more private keys from the certificates and/or digital signatures provided by the certification authorities, the compromising entity may not have the private key associated with the public key from the self-signed certificate or digital signature. In some instances the compromising entity may be a passive listener to the interactions between the user application 27 and the organization application 17 (e.g., listener-in-the-middle attack). A passive listener would be an entity that has access to the private keys associated with the certificates validated by the certification authorities, but instead of redirecting communication (e.g., man-in-the middle attack) the passive compromising entity just listens into the interactions. As such, a self-signed certificate adds an additional layer of security in that while the self-signed certificate is not verified by a certification authority it can be used for encryption of the symmetric session key to protect the interaction because it is unlikely that the passive listener to the interaction would have the private keys of the one or more certificates validated by the certification authorities as well as the private key of the self-signed certificate generated by the organization. In one example, the user application 27 may utilize a public key from a certificate or digital signature validated by a certification authority, and a self-created public key from a self-signed certificate or digital signature in order to encrypt the session key using two public keys (e.g., in a string, embedded, or function configuration, or the like).

It should be further understood that a self-signed certificate may be utilized for any type of time frame, for example, it could be created and used for a single interaction between the user application 27 and the organization application 17, and thereafter discarded or placed back into a pool of self-signed certificates for future use. In other examples, the self-signed certificate may be utilized for a day, week, month, year, or the like, and it may or may not be utilized with a single user application 17.

FIG. 6 illustrates a process flow for using certification requirements to identify potential compromised interactions between a user application 27 and an organization application 17, and/or to identify unauthorized entities involved in the potential compromised interactions. In addition to the other benefits of utilizing two or more certificates described herein, two or more certificates may be utilized to prevent unauthorized entities from intercepting an interaction (e.g., communication, transaction, or the like) between a user application 27 and an organization application 17 and redirecting the interaction using a compromised or substitute certificate (e.g., a man-in-the-middle attack).

When a user application 27 interacts with an organization application 17 an unauthorized entity may intercept the initial communication and redirect the interaction between the user and organization using a compromised certificate from the organization application or using a substitute certificate generated by the unauthorized entity. By requiring two or more certificates it is unlikely that the unauthorized entity could compromise two or more of the certificates from the organization application and/or create two or more substitute certificates that could be verified. However, unless a user application 27 knows the certification requirements for the organization application 17, the user application 27 may not know if the certification requirements and/or one or more certificates that it is receiving are actually from the organization application 17 or from an unauthorized entity trying to compromise the interaction. For example, when being accessed by a user application 27, the organization application 17 may send the user application 17 five certificates and indicate that in order to verify the organization application 17 two of the five certificates must be verified. However, if an unauthorized entity intercepts the communication from the organization application 17 the unauthorized entity may relay to the user application 17 one or more certificates and indicate to the user application 27 that only one of the certificates needs to be verified (e.g., the unauthorized entity would only send one certificate that can be verified). As such, the user application 27 would not know if the certification requirements and/or certificates it received are from the organization application 17 or from a potential unauthorized entity.

The system and process described with respect to FIG. 6 regarding of the use of certification requirements allows the user application 27 to identity potential compromised interactions with the organization application 17 before the interaction is fully initiated and before a secure session is established. It should be understood that the certification requirements described with respect to FIG. 6 may include how or what the user application 27 does to verify the certificates received from the organization application. As such, the certification requirements may include threshold requirements, such as a threshold number of certifications that require verification (e.g., at least two verified certificates, at least three verified certificates, or the like). The certification requirements may also include the certification authorities from which the certificates were verified (e.g., the specific entities that the organization uses to provide the certificates and/or a threshold number of verified certificates from different certification authorities). The certification requirements may further include the number of certificates, or minimum threshold number of certificates, provided by the organization entity. For example, the organization may usually provide four certificates, but may indicate in the certification requirements that at least three certificates are always provided and that at least two of the certificates provided must be verified (e.g., not expired, compromised, or revoked, or the like). As such, the stored certification requirements may be compared by the user application (e.g., web browser) against received certification requirements in order to determine when an unauthorized entity may be trying to set up an interaction using certificates that do not meet the certification requirements set up by the organization application 17 (e.g., a website). The process of using two or more certificates to identify potential compromised interactions initiated by unauthorized entities (e.g., man-in-the-middle attacks) is described in further detail below with reference to FIG. 6.

As illustrated in block 510 of FIG. 6, the user application 27 (e.g., user web browser) accesses the organization application 17 to undergo an interaction (e.g., initiate a communication, a transaction, or the like). As previously discussed herein, during the initial request for the interaction the user application 27 requests that the organization application 17 sends the organization's certificates for the organization application 17. Alternatively, the organization application 17 may automatically send its certificates for the organization application 17 to the user application 27 when contacted by the user application 27 to initiate an interaction. For example, the web browser may access a website and either request the website to send its certificates or automatically receive its certificates after initiating the contact.

Block 520 of FIG. 6 illustrates that the user application 27 will also identify the stored certification requirements for the organization application 17. This step may occur before, after, or during (or a combination thereof) verifying the one or more certificates received by the user application 27 from the organization application 17. In some instances, the user application 27 may verify the organization application's certification requirements through the use of a pinning technique. For example, when a user web browser accesses an organization website for the first time, the web browser may receive the certification requirements from the organization application 27 along with the organization's certificates. When received for the first time the web browser may store the certification requirements (e.g., pin) within the web browser or associated system (e.g., the user computer system 20, the user application system 50, or other like system). This pinning process may first include identifying that the user web browser is visiting the organization website for the first time. Next, the pinning process may include requesting the certification requirements from the organization website, or otherwise automatically receiving the certification requirements after initiating the interaction with the organization website. Thereafter, the web browser may "pin" the certification requirements, such as store the certification requirements for future use. As such, when the web browser revisits the organization website in the future, it already has the certification requirements stored (e.g., pinned), and thus, will not re-store the certification requirements on subsequent visits. However, it should be understood that the web browser may periodically re-check and/or re-store (e.g., re-pin) the certification requirements to determine if they have changed. For example, the web browser may re-check and/or re-store the certification requirements monthly, by-annually, or the like. The pinning process may prevent man-in-the-middle attacks the by pinning the certification requirements the first time the user application 27 accesses the organization application 17, and can identify anytime the received certification requirements do not meet the pinned certification requirements. The one issue that may occur is if the man-in-the-middle attack occurs when the user application 27 is pinning the initial certification requirements (or when it is updating the pinned certification requirements) the user application 27 may pin the information provided by the man-in-the-middle attack and not the actual certification requirements from the organization application 17. This instances may be identified when the user application 27 subsequently visits the organization application 17 and the pinned certification requirements do not meet the received certification requirements.

In other embodiments of the invention, in addition to, or instead of, pinning the certification requirements, the certification requirements may be stored by a certification requirement system (e.g., one type of the certificate systems 40 previously discussed herein), which may be operated by a third party unaffiliated with the web browser and the organization website. The certification requirement system may store the certification requirements for various websites. For example, the certification requirement system may store that website 1 requires verification of one certification, website 2 requires verification of two certificates, and website 3 requires verification of three certificates. Moreover, the certification requirement system may store other certification requirements, such as for example, the minimum number of certificates that the website will provide for verification, the certification authorities that the website uses for its certificates, or the like. It should be understood that the certification requirements may change over time, and as such, the web browser may contact the certification requirement system each time the web browser visits a website in order to identify the certification requirements for the website that the web browser is visiting. As such, in order for the interaction to be compromised by a man-in-the-middle attack the man-in-the-middle would need to compromise the certification requirement systems as well as the one or more certificates provided by the organization application 17 (and validated by the certification requirement systems and/or the certification authorities). However, a potential issue with this embodiment is that when the certification requirement systems are down, or the subject of an attack over the internet (e.g., a spamming attack), the user application 27 will not be able to access the certification requirement systems to identify the certification requirements.

In other embodiments of the invention, in addition to, or instead of pinning the certification requirements, the certification requirements may be stored within a certificate (e.g., certification requirement certificates, or the like). For example, instead of a certification requirement system (e.g., one type of the certificate systems 40 previously discussed herein) storing the certification requirements on a database for the user application 27 to access (e.g., for each interaction, or periodically) the certification requirements may be stored within a certificate (e.g., a certification requirement certificate) that is validated. As such, the certificate may be validated by the third-party entity associated with the certification requirement system, for example, the certificate may be created and validated by the entity responsible for certification requirement system. Alternatively, the certificate may be validated by a certification authority. The certification requirement certificates are created and validated in the same way as the other certificates (e.g., verification certificates used to verify the organization application) as described herein. As such, the certification requirement certificates are created and made the same way as the other certificates described herein; however, the certification requirement certificates are used for a purpose that is different than the verification certificates. Regardless of how the certification requirement certificates are validated, the certificates are provided to the organization application 17. As such, when the user application 27 accesses the organization application 17 the organization application 17 provides the one or more certificates to the user application 27 for verifying the organization application 17, and additionally the organization application 17 provides one or more certification requirement certificates. The user application 27 may verify the certification requirement certificate the same way as the other certificates are verified. For example, verification may occur by comparing the certification authority that validated the certification requirement certificate with a list of trusted certification authorities stored by the user application 27 (e.g., web browser) or by a third-party entity. The user application 27 uses the certification requirements stored in the certification requirement certificate to verify the organization application 17, as discussed herein. As such, in order for the interaction to be compromised by a man-in-the-middle attack the man-in-themiddle would need to compromise the certification requirement certificates as well as the one or more verification certificates used to verify the organization application 17. It is unlikely that a man-in-the-middle would be able to compromise all the certificates.

In other embodiments, a combination of the certification requirement system storing the certification requirements, the certification requirement certificates, and/or certification requirement pinning may be utilized by the web browser. For example, the web browser may first access the certification requirement system to determine certification requirements, and if the certification requirements for a website are not stored by the certification requirement system, then the web browser may receive the certification requirements from the website and pin the certification requirements the first time the web browser visits the website (or periodically thereafter).

In other embodiments, the web browser may access the certification requirement system when first visiting the website to determine the certification requirements, and then store the certification requirements for future use (e.g., pin). As such, the web browser does not have to revisit the certification requirement system to identify the certification requirements of the website until the stored certification requirements do not meet the received certification requirements received from the website. At this time the web browser may revisit the certification requirement systems to determine if the certification requirements have changed or to determine if an unauthorized entity is trying to compromise the interaction between the web browser and the website.

FIG. 6 further illustrates in block 530 that the user application 27 receives the received certification requirements for the current interaction with the organization application 17, along with the certificates from the organization application 17. The received certification requirements may be received at the same time or at a different time from the receipt of the certificates. In some instances there may be any number of certificates received from the organization application 17. For example, a web browser may receive five certificates, four of which are from different certification authorities and two of which are from the same certification authority. However, the certification requirements may only require that two of the five be verified (e.g., at least two are not expired, not knowingly compromised, and not revoked, as previously discussed herein), the two verified certificates are from different certification authorities, and/or that at least three certificates were received. It should be understood that the certification requirements may be different for each of the websites (between different organizations or for different websites within an organization) depending on how much security the individual websites would like to require for verification. Moreover, the certification requirements may be any of the certification requirements alone, or any combination of the one or more certification requirements.

Block 540 of FIG. 6 illustrates that the user application 27 determines when the received certification requirements meet the stored certification requirements. For example, the web browser checks to determine if the certification requirements received from the website meet the certification requirements stored (e.g., pinned) by the web browser, meet the certification requirements stored by the third party certification requirement systems, and/or meet the certification requirements stored in the one or more certification requirement certificates received from the organization application 17. For example, a determination is made that the received certification requirements meet thresholds for the stored certification requirements. Returning to the example previously discussed, the stored certification requirements may require that at least three certificates are provided to the web browser, at least two of the certificates are verified, and that the verified certificates are from two different certification authorities. When the received certification requirements meet the thresholds in the stored certification requirements, the interaction between the user application 27 and the organization application 17 is allowed to proceed, and the process moves to block 570.

Alternatively, when the received certification requirements do not meet the thresholds for the stored certification requirements the process may move to block 550. Returning to the example discussed herein, the received certification requirements may indicate that only two certifications are required, that only one certificate can be verified, or that all of the certificates are from the same certification authority. As such, in this example, if any one of the received certification requirements do not meet the corresponding stored certification requirements a potential compromised interaction may be occurring. Returning to FIG. 6, Block 550 illustrates that when the received certification requirements fail to meet at least one of the threshold certification requirements a determination is made if one or more certificates received meet an authorized certificate. In one example, an authorized certificate may be utilized by an entity to monitor the Internet use of its employees. For example, an entity may monitor the website visits of its employees in order to determine that the employees are not unknowingly downloading computer viruses, are not transferring confidential information, or for other like reasons. In order to monitor the employee web traffic, the authorized entity may have to re-route web traffic of the users using an authorized certificate that is different than the certificates received from the website. This situation may be known as an authorized man-in-the-middle. As such, the user application 27 (e.g., web browser) or another application owned by the entity may store authorized certificates. When the certificate received by the user application 27 (e.g., the web browser) meets the stored authorized certificates, the user application 27 (web browser) will continue to allow the interaction even though the authorized certificate does not meet the thresholds of the stored certification requirements for the website. It should be understood that when the received certification requirements and associated certificates received by the web browser do not meet the thresholds of the stored certification requirements, and moreover, when the received certificates do not correspond to an authorized certificate there may be a potential unauthorized user trying to compromise the interaction (e.g., a potential man-in-the-middle attack) and the process may move to block 560.

Block 560 of FIG. 6 illustrates that the user application 17 may notify the user of the potential unauthorized entity (e.g., the potential man-in-the-middle attack) and/or prevent the interaction between the user application 27 and the organization application 17. For example, in some instances the web browser may provide a notification to the user (e.g., through the user computer system 20 on the user application 27) that the interaction between the web browser and the website may be potentially compromised by an unauthorized entity (e.g., a man-in-the-middle attack). The notification may be the same as or similar to the notifications previously described herein (e.g., pop-up notification that requires acknowledgement). In another example, the web browser may simply prevent any interactions with the website. For example, the actions of the web browser may be set by the entity controlling the use of the web browser (e.g., the employer) to prevent any interactions if there is a potential unauthorized entity in the middle of the interaction. In other examples, the user may continue with the interaction after the notification if the user provides an indication that the user is aware of the potential unauthorized entity, as previously described herein.

Block 570 of FIG. 6 illustrates that the interaction between the user application 27 (e.g., web browser) and the organization application 17 (e.g., website) is allowed to proceed when the received certification requirements and associated certificates received meet the thresholds of the stored certification requirements, when the received certificates meet authorized certificates (e.g., an authorized man-in-the-middle), or when the user and/or user application 17 allows the interaction to occur even after an indication of the potential unauthorized entity.

FIG. 6 illustrates in block 580 that the user application 27 will then utilize the one or more certificates received and/or the public/private key pairs to initiate the secure session between the user application 27 and the organization application 17. For example, the one or more certificates may be verified and/or the secure session may be initiated as previously discussed herein.

However, it should be understood that while the process described in FIG. 6 will aid in preventing man-in-the-middle attacks, it may not aid in preventing attacks from a passive listener to the conversation if the passive listener has access to the public keys associated with the certificates (e.g., has compromised the certification authorities). As such, in addition to utilizing the certification requirements as described in FIG. 6, the organization may also utilize a self-created certificate (previously described above) in addition to one or more public keys from one or more certificates validated by the one or more certification authorities in order to encrypt the symmetric session key (e.g., using the multiple keys in series, embedded, or with a function as previously described herein). In this way a passive listener would have had to compromise both the private key(s) associated with the certificates validated by the certification authorities, and the private key associated with the self-signed certificate in order to listen in on the interaction between the user application 27 and the organization application 17.

The use of certification requirements are described above with respect to FIG. 6 as being utilized when a web browser accesses a website, but it should be understood that the process may work in the same way for other user applications 27 and/or organization applications 17, such as dedicated applications.

It should be understood that the interactions described herein are described with respect to a user application 27 communicating with the organization application 17; however, it should be further understood that when discussing these applications, the references to these applications could be substituted with the systems associated with these applications. For example, references to the user application 27 and web browser could be replaced with the user computer systems 20 or user application systems 50, and references to the organization application 17 and website could be replaced with the organization systems 10, or any components thereof.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively monitoring the resource usage and availability. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously monitoring the real-time data feeds from the various systems, the systems may be configured to update activities associated with the systems, as described herein.

Moreover, it should be understood that the process flows described herein include transforming the data from the different systems (e.g., internally or externally) from the data format of the various systems to a data format associated with the reports for display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent Application Ser. No. | Title | Filed On |
| --- | --- | --- |
| 15/453,635 | SECURE VERIFICATION SYSTEM | Concurrently herewith |
| 15/453,644 | SECURE SESSION CREATION SYSTEM UTILILIZING MULTIPLE KEYS | Concurrently herewith |
| 15/453,649 | CERTIFICATE SYSTEM FOR VERIFYING AUTHORIZED AND UNAUTHORIZED SECURE SESSIONS | Concurrently herewith |

What is claimed is:

1. A system for accessing secure applications provided by an organization, the system comprising:
   one or more memory devices having computer readable code store thereon; and
   one or more processing devices operatively coupled to the one or more memory devices, wherein the one or more processing devices are configured to execute the computer readable code to:
   access an organization application, through an organization system or a third party system;
   access two or more digital signatures associated with the organization application, wherein the two or more digital signatures are included within a single certificate on the organization application;
   attempt to verify at least one of the two or more digital signatures as being signed by a certification authority that is trusted, wherein attempting to verify the at least one of the two or more digital signatures comprises:
      attempting to verify a first digital signature, wherein the first digital signature indicating validation of the organization providing the organization application is provided by a first certification authority;
      failing to verify the first digital signature;
      attempting to verify a second digital signature, wherein the second digital signature indicating validation of the organization providing the organization application is provided by a second certification authority; and
      verifying the second digital signature; and
   receive and send information from and to the organization application after verifying the organization application using the at least one of the two or more digital signatures;
   wherein the two or more digital signatures are provided on the single certificate by the first certification authority and the second certification authority.

2. The system of claim 1, wherein attempting to verify the at least one of the two or more digital signatures comprises:
   attempting to verify a third digital signature;
   verifying the third digital signature; and
   wherein receiving and sending the information is allowed after the second digital signature and the third digital signature are verified.

3. The system of claim 1, wherein receiving and sending the information comprises receiving and sending the information over a secure session, and wherein the one or more processing devices are configured to execute the computer readable code to create the secure session by:
   identifying a public key associated with the at least one of the two or more digital signatures within the single certificate when the at least one of the two or more digital signatures are verified;

creating a symmetric session key for the secure session with the organization application;

encrypting the symmetric session key to create an encrypted symmetric session key using the public key;

sending the encrypted symmetric session key to the organization application, wherein the organization application utilizes a private key to decrypt the encrypted symmetric session key to identify the symmetric session key; and receiving and sending the information from and to the organization application using the symmetric session key.

4. The system of claim 3, wherein the public key is associated with the two or more digital signatures.

5. The system of claim 3, wherein the public key is from two or more public keys associated with the two or more digital signatures.

6. The system of claim 3, wherein the one or more processing devices are further configured to execute the computer readable code to:

identify two or more public keys associated with the two or more digital signatures;

wherein encrypting the symmetric session key to create the encrypted symmetric session key comprises encrypting the symmetric session key using the two or more public keys in a string configuration, in an embedding configuration, or in a function configuration; and wherein the organization application utilizes two or more private keys associated with the two or more public keys to decrypt the encrypted symmetric session key to identify the symmetric session key.

7. The system of claim 1, wherein the two or more digital signatures are verified and an order in which the two or more digital signatures are verified is provided to the organization application, and wherein the order in which the two or more digital signatures are verified is utilized to create a secure session between a user application and the organization application.

8. A computer implemented method for accessing secure applications provided by an organization, the method comprising:

accessing, by one or more processors, an organization application, through an organization system or a third party system;

accessing, by the one or more processors, two or more digital signatures associated with the organization application, wherein the two or more digital signatures are included within a single certificate on the organization application;

attempting, by the one or more processors, to verify at least one of the two or more digital signatures as being signed by a certification authority that is trusted, wherein attempting to verify the at least one of the two or more digital signatures comprises:

attempting to verify a first digital signature, wherein the first digital signature indicating validation of the organization providing the organization application is provided by a first certification authority;

failing to verify the first digital signature;

attempting to verify a second digital signature, wherein the second digital signature indicating validation of the organization providing the organization application is provided by a second certification authority; and verifying the second digital signature; and receiving and sending, by the one or more processors, information from and to the organization application after verifying the organization application using the at least one of the two or more digital signatures;

wherein the two or more digital signatures are provided on the single certificate by the first certification authority and the second certification authority.

9. The method of claim 8, wherein attempting to verify the at least one of the two or more digital signatures comprises:

attempting to verify a third digital signature;

verifying the third digital signature; and wherein receiving and sending the information is allowed after the second digital signature and the third digital signature are verified.

10. The method of claim 8, wherein receiving and sending the information comprises receiving and sending the information over a secure session, and wherein the secure session is created by:

identifying, by the one or more processors, a public key associated with the at least one of the two or more digital signatures within the single certificate when the at least one of the two or more digital signatures are verified;

creating, by the one or more processors, a symmetric session key for the secure session with the organization application;

encrypting, by the one or more processors, the symmetric session key to create an encrypted symmetric session key using the public key;

sending, by the one or more processors, the encrypted symmetric session key to the organization application, wherein the organization application utilizes a private key to decrypt the encrypted symmetric session key to identify the symmetric session key; and receiving and sending, by the one or more processors, the information from and to the organization application using the symmetric session key.

11. The method of claim 10, further comprising:

identifying, by the one or more processors, two or more public keys associated with the two or more digital signatures;

wherein encrypting the symmetric session key to create the encrypted symmetric session key comprises encrypting the symmetric session key using the two or more public keys in a string configuration, in an embedding configuration, or in a function configuration; and wherein the organization application utilizes two or more private keys associated with the two or more public keys to decrypt the encrypted symmetric session key to identify the symmetric session key.

12. The method of claim 8, wherein the two or more digital signatures are verified and an order in which the two or more digital signatures are verified is provided to the organization application, and wherein the order in which the two or more digital signatures are verified is utilized to create a secure session between a user application and the organization application.

13. A computer program product for accessing secure applications provided by an organization, the computer program product comprising at least one non-transitory computer-readable medium having computer-readable program code portions embodied therein, the computer-readable program code portions comprising:

an executable portion configured to access an organization application, through an organization system or a third party system;

an executable portion configured to access two or more digital signatures associated with the organization application, wherein the two or more digital signatures are included within a single certificate on the organization application;

an executable portion configured to attempt to verify at least one of the two or more digital signatures as being signed by a certification authority that is trusted, wherein attempting to verify the at least one of the two or more digital signatures comprises:

attempting to verify a first digital signature, wherein a first digital signature indicating validation of the organization providing the organization application is provided by a first certification authority;

failing to verify the first digital signature;

attempting to verify a second digital signature, wherein a second digital signature indicating validation of the organization providing the organization application is provided by a second certification authority; and verifying the second digital signature; and an executable portion configured to receive and send information from and to the organization application after verifying the organization application using the at least one of the two or more digital signatures;

wherein the two or more digital signatures are provided on the single certificate by the first certification authority and the second certification authority.

14. The computer program product of claim 13, wherein attempting to verify the at least one of the two or more digital signatures comprises:

attempting to verify a third digital signature;

verifying the third digital signature; and wherein receiving and sending the information is allowed after the second digital signature and the third digital signature are verified.

15. The computer program product of claim 13, wherein the executable portion configured to receive and send the information comprises receiving and sending the information over a secure session, and wherein the computer-readable program code portions further comprise:

an executable portion configured to identify a public key associated with the at least one of the two or more digital signatures within the single certificate when the at least one of the two or more digital signatures are verified;

an executable portion configured to create a symmetric session key for the secure session with the organization application;

an executable portion configured to encrypt the symmetric session key to create an encrypted symmetric session key using the public key;

an executable portion configured to send the encrypted symmetric session key to the organization application, wherein the organization application utilizes a private key to decrypt the encrypted symmetric session key to identify the symmetric session key; and an executable portion configured to receive and send the information from and to the organization application using the symmetric session key.

16. The computer program product of claim 15, wherein the public key is associated with the two or more digital signatures, or wherein the public key is from two or more public keys associated with the two or more digital signatures.

17. The computer program product of claim 15, wherein the computer-readable program code portions further comprises:

an executable portion configured to identify two or more public keys associated with the two or more digital signatures;

wherein encrypting the symmetric session key to create the encrypted symmetric session key comprises encrypting the symmetric session key using the two or more public keys in a string configuration, in an embedding configuration, or in a function configuration; and wherein the organization application utilizes two or more private keys associated with the two or more public keys to decrypt the encrypted symmetric session key to identify the symmetric session key.

18. The computer program product of claim 13, wherein the two or more digital signatures are verified and an order in which the two or more digital signatures are verified is provided to the organization application, and wherein the order in which the two or more digital signatures are verified is utilized to create a secure session between a user application and the organization application.

19. The method of claim 10, wherein the public key is associated with the two or more digital signatures.

20. The method of claim 10, wherein the public key is from two or more public keys associated with the two or more digital signatures.

* * * * *